US011558080B1

(12) United States Patent
Jin et al.

(10) Patent No.: US 11,558,080 B1
(45) Date of Patent: Jan. 17, 2023

(54) TRANSCEIVER DEVICE AND METHOD OF DRIVING THE SAME

(71) Applicant: SAMSUNG DISPLAY CO., LTD., Yongin-si (KR)

(72) Inventors: Tae Young Jin, Yongin-si (KR); Dong Won Park, Yongin-si (KR); Jun Dal Kim, Yongin-si (KR); Hyun Su Kim, Yongin-si (KR); Kyung Youl Min, Yongin-si (KR); Jong Man Bae, Yongin-si (KR); Jun Yong Song, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/576,169

(22) Filed: Jan. 14, 2022

(30) Foreign Application Priority Data

Jun. 25, 2021 (KR) .................. 10-2021-0083040

(51) Int. Cl.
  *H04B 1/7156* (2011.01)
  *H04L 7/00* (2006.01)
  (Continued)

(52) U.S. Cl.
  CPC ............ *H04B 1/7156* (2013.01); *G09G 3/20* (2013.01); *H04B 1/38* (2013.01); *H04L 7/0008* (2013.01);
  (Continued)

(58) Field of Classification Search
  CPC ...... H04B 1/38; H04B 1/7156; H04B 1/7143; H04B 1/7136; G09G 3/20; H04L 7/0008
  See application file for complete search history.

(56) References Cited

U.S. PATENT DOCUMENTS 11,176,876 B1 * 11/2021 Lee .................. G09G 3/32
2016/0293096 A1   10/2016 Nose
(Continued)

FOREIGN PATENT DOCUMENTS

KR         100672494 B1    4/2007

OTHER PUBLICATIONS

Tektronix: "Understanding and Performing MIPI D-PHY Physical Layer, CSI and DSI Protocol Layer Testing Application Note Introduction", Nov. 17, 2017, XP055975528.

*Primary Examiner* — Khanh C Tran
(74) *Attorney, Agent, or Firm* — Cantor Colburn LLP

(57) ABSTRACT

A transceiver device includes a transmitter and a receiver connected through first and second lines. A first frame period includes an active period for transmitting a first payload and a vertical blank period including a frequency hopping period. The transmitter transmits, to the first and second lines, signals having a first voltage range in a first mode and signals having a second voltage range in a second mode. The transmitter generates a first horizontal synchronization signal in the second mode except for the frequency hopping period, encodes the first horizontal synchronization signal to horizontal synchronization data, and generates a second horizontal synchronization signal in the first mode in the frequency hopping period. The transmitter adds a first clock training pattern to the horizontal synchronization data except for the frequency hopping period, and adds a second clock training pattern to first horizontal synchronization data after the frequency hopping period.

23 Claims, 16 Drawing Sheets

(51) Int. Cl.
*G09G 3/20* (2006.01)
*H04B 1/38* (2015.01)

(52) U.S. Cl.
CPC .................. *G09G 2310/08* (2013.01); *H04B 2001/71566* (2013.01)

(56) References Cited

U.S. PATENT DOCUMENTS

| | | | |
|---|---|---|---|
| 2017/0311030 A1* | 10/2017 | Toba | H04N 21/442 |
| 2018/0062883 A1 | 3/2018 | Duan et al. | |
| 2019/0348007 A1* | 11/2019 | Lee | G09G 3/3677 |
| 2020/0357324 A1* | 11/2020 | Park | G09G 3/2003 |
| 2020/0393947 A1* | 12/2020 | Kim | G06F 3/0442 |
| 2021/0043132 A1* | 2/2021 | Nam | G09G 3/3233 |
| 2021/0193020 A1* | 6/2021 | Ka | G09G 3/3266 |
| 2022/0148509 A1* | 5/2022 | Yamamoto | G09G 3/3233 |
| 2022/0199025 A1* | 6/2022 | Hong | G09G 3/3233 |

\* cited by examiner

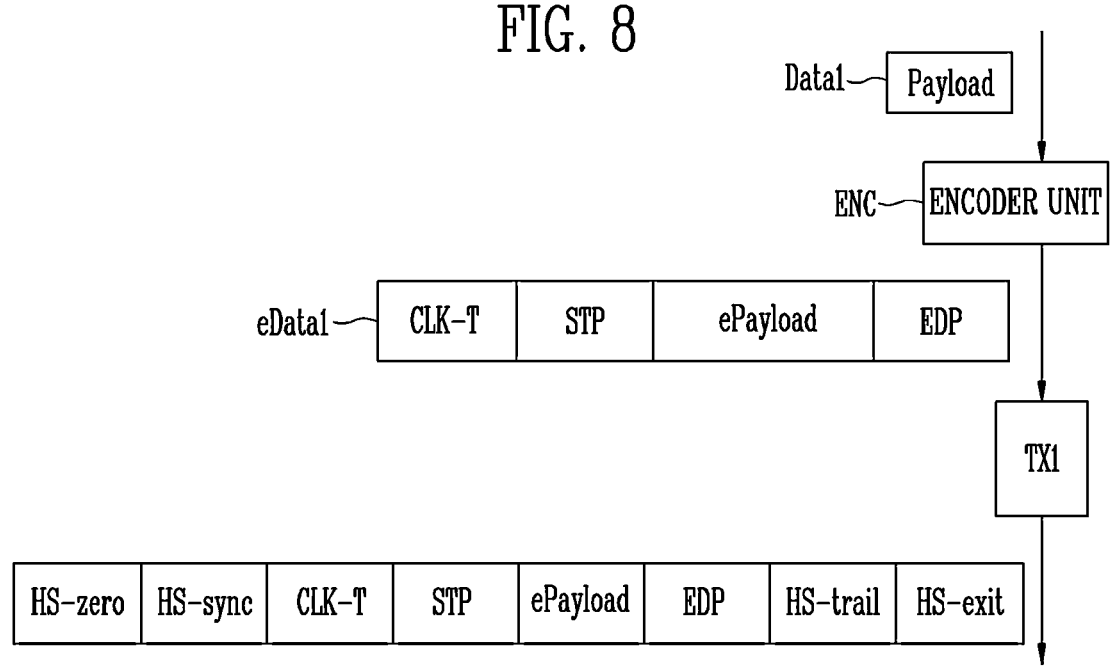

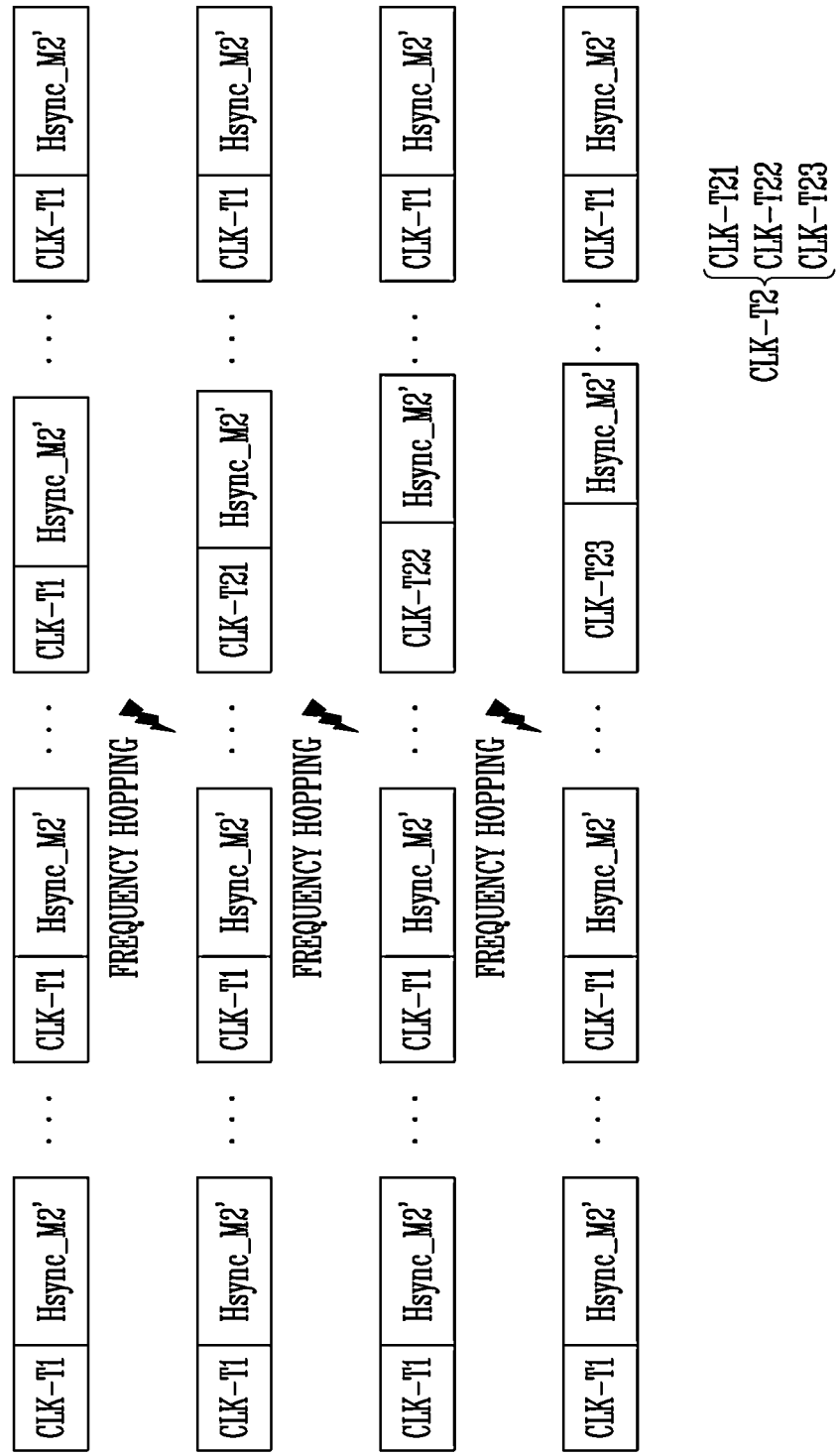

TRANSCEIVER DEVICE AND METHOD OF DRIVING THE SAME

This application claims priority to Korean Patent Application No. 10-2021-0083040, filed on, Jun. 25, 2021, and all the benefits accruing therefrom under 35 U.S.C. § 119, the content of which in its entirety is herein incorporated by reference.

BACKGROUND

1. Field

The disclosure relates to a transceiver device and a method of driving the transceiver.

2. Description of the Related Art

As an information technology is developed, importance of a display device that is a connection medium between a user and information is emphasized. Accordingly, a use of a display device such as a liquid crystal display device and an organic light emitting display device is increasing.

SUMMARY

In general, a display device may perform internal communication using a mobile industry processor interface ("MIPI") protocol. When using the MIPI protocol, a clock lane (for example, a clock line) may be separately used such that physical/spatial cost increases and power consumption increases.

In a case where a transmitter with the clock lane operates based on a changed clock signal even though a data transmission speed between the transmitter and a receiver is changed due to performance of frequency hopping to prevent frequency interference with a base station, synchronization of a horizontal synchronization signal may not be effectively performed. On the other hand, in a case of a transmitter using a clock embedded method, when the data transmission speed between the transmitter and the receiver is changed due to the frequency hopping, the receiver (or a clock data recovery circuit) may request more time for tracking changed frequency information and phase information.

Embodiments of the disclosure provide a clock embedded transceiver device capable of synchronizing a horizontal synchronization signal transmitted from a transmitter with a horizontal synchronization signal recovered by a receiver even though a frequency hopping period is included, and a method of driving the transceiver device.

According to an embodiment of the disclosure, a transceiver device includes a transmitter and a receiver connected to each other through a first line and a second line. In such an embodiment, a first frame period includes an active period in which a first payload is transmitted from the transmitter to the receiver and a vertical blank period including a frequency hopping period in which a data transmission speed between the transmitter and the receiver is variable. In such an embodiment, the transmitter transmits signals having a first voltage range to the first line and the second line in a first mode, and transmits signals having a second voltage range less than the first voltage range to the first line and the second line in a second mode. In such an embodiment, the transmitter generates a first horizontal synchronization signal in the second mode in a period except for the frequency hopping period of the vertical blank period, encodes the first horizontal synchronization signal to horizontal synchronization data, and generates a second horizontal synchronization signal in the first mode in the frequency hopping period. In such an embodiment, the transmitter adds a first clock training pattern to the horizontal synchronization data in the period except for the frequency hopping period of the vertical blank period, and adds a second clock training pattern different from the first clock training pattern to first horizontal synchronization data after the frequency hopping period is ended.

In an embodiment, a length of the second clock training pattern may be longer than a length of the first clock training pattern.

In an embodiment, a length of the second clock training pattern may be variable based on a change range of the data transmission speed.

In an embodiment, the length of the second clock training pattern may increase as the change range of the data transmission speed increases.

In an embodiment, the transmitter may generate the first payload by encoding an original payload in the second mode during the active period, and transmit a third clock training pattern and the first payload through the first line and the second line.

In an embodiment, the transmitter may include a data transmitter which generates a first internal clock signal and a second internal clock signal, and transmits first encoded data to which the first clock training pattern or the second clock training pattern is added to the first line and the second line during the vertical blank period, a transmission controller which receives the first and second internal clock signals, generates the first horizontal synchronization signal in the second mode based on the first internal clock signal, and generates the second horizontal synchronization signal in the first mode based on the second internal clock signal, and an encoder unit which receives only the first internal clock signal of the first and second internal clock signals, generates the horizontal synchronization data by encoding the first horizontal synchronization signal received from the transmission controller based on the first internal clock signal, and generates the first encoded data by adding the first clock training pattern or the second clock training pattern to the horizontal synchronization data.

In an embodiment, the data transmitter may generate only the second internal clock signal without generating the first internal clock signal during the frequency hopping period.

In an embodiment, the transmission controller may transmit the original payload to the encoder based on the first internal clock signal.

In an embodiment, the encoder may encode the original payload provided from the transmission controller to the first payload including an encoding key.

In an embodiment, the transmitter may further include a frequency hopping controller which provides a first register value related to whether the frequency hopping period is in an active state to the encoder unit, and the first register value may include a (1-1)th register value indicating that the frequency hopping period is changed from the active state to an inactive state and a (1-2)th register value indicating that the frequency hopping period is maintained as the active state or the inactive state.

In an embodiment, the transmission controller may provide the encoder unit with an end flag signal indicating that the frequency hopping period is ended, based on the first internal clock signal.

In an embodiment, the encoder unit may add the second clock training pattern to the horizontal synchronization data based on the (1-1)th register value and the end flag signal.

In an embodiment, the frequency hopping controller may provide a second register value including change range information of the data transmission speed to the encoder unit.

In an embodiment, the second register value may include a (2-1)th register value corresponding to first data transmission speed change range, a (2-2)th register value corresponding to second data transmission speed change range, and a (2-3)th register value corresponding to third data transmission speed change range, and the data transmission speed change range may increase in an order of the first data transmission speed change range, the second data transmission speed change range, and the third data transmission speed change range.

In an embodiment, the encoder unit may increase a length of the second clock training pattern in an order of the (2-1)th register value, the (2-2)th register value, and the (2-3)th register value.

In an embodiment, the first line and the second line may be used in a single-ended method in the first mode, and the first line and the second line may be used in a differential method in the second mode.

According to an embodiment of the disclosure, a method of driving a transceiver device, including a transmitter and a receiver connected to each other through a first line and a second line, a first frame period includes an active period in which a first payload is transmitted from the transmitter to the receiver and a vertical blank period including a frequency hopping period in which a data transmission speed between the transmitter and the receiver is variable, includes transmitting signals having a first voltage range from the transmitter to the receiver in a first mode, transmitting signals having a second voltage range less than the first voltage range from the transmitter to the receiver in a second mode, generating, by a data transmitter included in the transmitter, a first internal clock signal and a second internal clock signal, generating, by the transmission controller included in the transmitter, a first horizontal synchronization signal in the second mode based on the first internal clock signal in a period except for the frequency hopping period of the vertical blank period, and generating, by the transmission controller included in the transmitter, a second horizontal synchronization signal in the first mode in the frequency hopping period, and encoding, by an encoder unit included in the transmitter, the first horizontal synchronization signal to horizontal synchronization data in the second mode in the period except for the frequency hopping period of the vertical blank period, and adding a first clock training pattern to the horizontal synchronization data, the method may further include determining, by the encoder unit, whether the frequency hopping occurs, and the method may further include adding, by the encoder unit, a second clock training pattern different from the first clock training pattern to first horizontal synchronization data after the frequency hopping period is ended, when it is determined that the frequency hopping occurs.

In an embodiment, a length of the second clock training pattern may be longer than a length of the first clock training pattern.

In an embodiment, the adding the second clock training pattern may include varying a length of the second clock training pattern in response to a change range of the data transmission speed.

In an embodiment, the varying the length of the second clock training pattern may include increasing the length of the second clock training pattern as the data transmission speed change range increases.

In an embodiment, the method may further include providing, by a frequency hopping controller included in the transmitter, a first register value related to whether the frequency hopping period is in an active state to the encoder unit, and the first register value may include a (1-1)th register value indicating that the frequency hopping period is changed from the active state to an inactive state and a (1-2)th register value indicating that the frequency hopping period is maintained as the active state or the inactive state.

In an embodiment, the method may further include providing, by the transmission controller, the encoder unit with an end flag signal indicating that the frequency hopping period is ended, based on the first internal clock signal.

In an embodiment, the determining whether the frequency hopping occurs may include determining, by the encoder unit, that the frequency hopping occurs when the encoder unit receives the (1-1)th register value and the end flag signal.

In embodiments of the transceiver device and the method of driving the transceiver device, a horizontal synchronization signal transmitted from the transmitter and a horizontal synchronization signal recovered by the receiver may be synchronized, by adjusting the length of the clock training pattern added to the encoded horizontal synchronization signal even though the frequency hopping period is included.

BRIEF DESCRIPTION OF THE DRAWINGS

The above and other features of the disclosure will become more apparent by describing in further detail embodiments thereof with reference to the accompanying drawings, in which:

FIGS. 8 and 9 are diagrams illustrating an embodiment of an operation of a transmitter included in the transceiver device of FIGS. 7A and 7B;

FIG. 15 is a diagram illustrating an operation of the transmitter that varies the length of the second clock training pattern in response to the data transmission speed change range of the transceiver device.

DETAILED DESCRIPTION

Figure 1A:
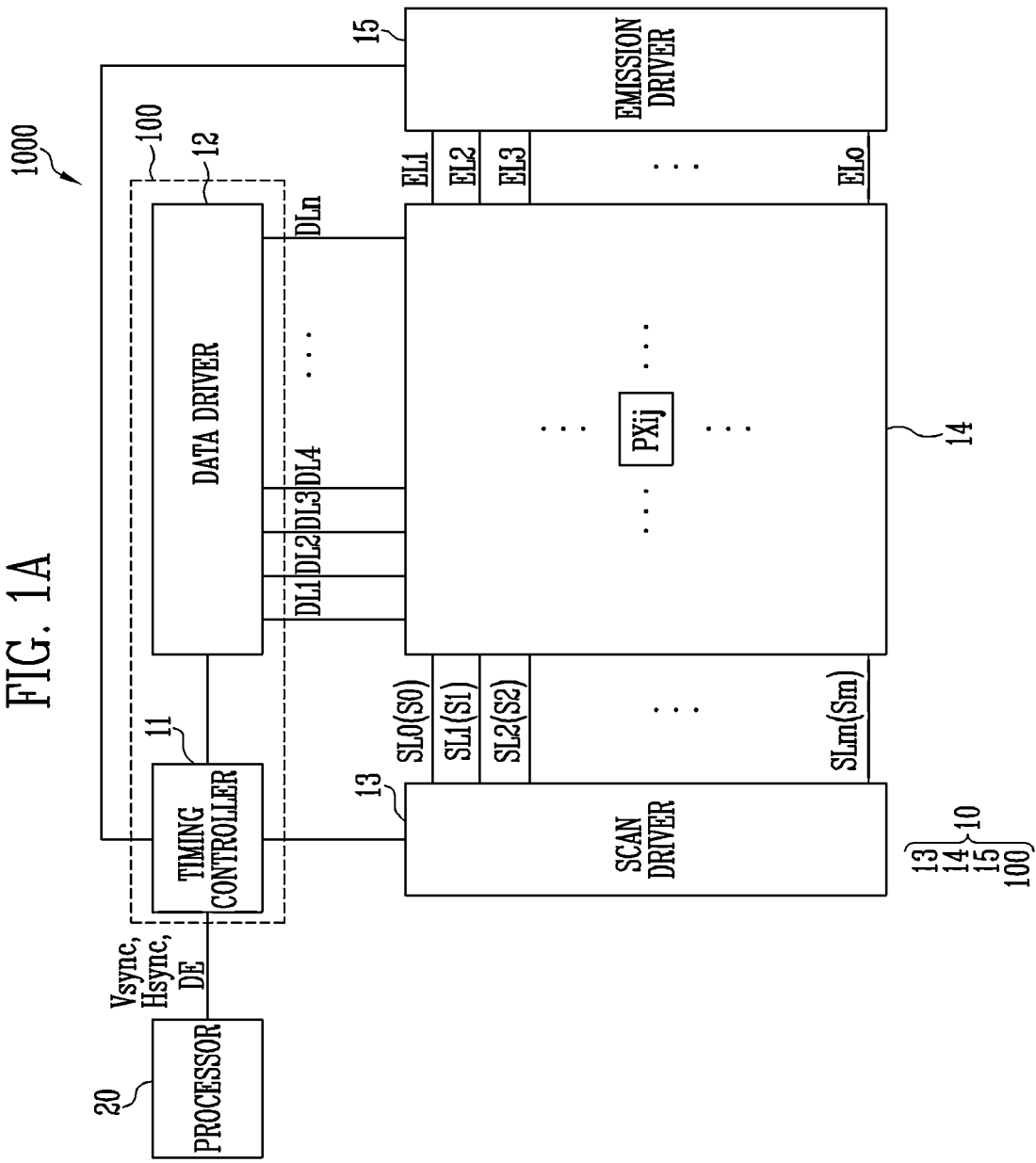
FIG. 1A is a block diagram illustrating a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In order to clearly describe the disclosure, parts that are not related to the description are omitted, and the same or similar components are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the disclosure will be described in detail with reference to the accompanying drawings.

Figure 1B:
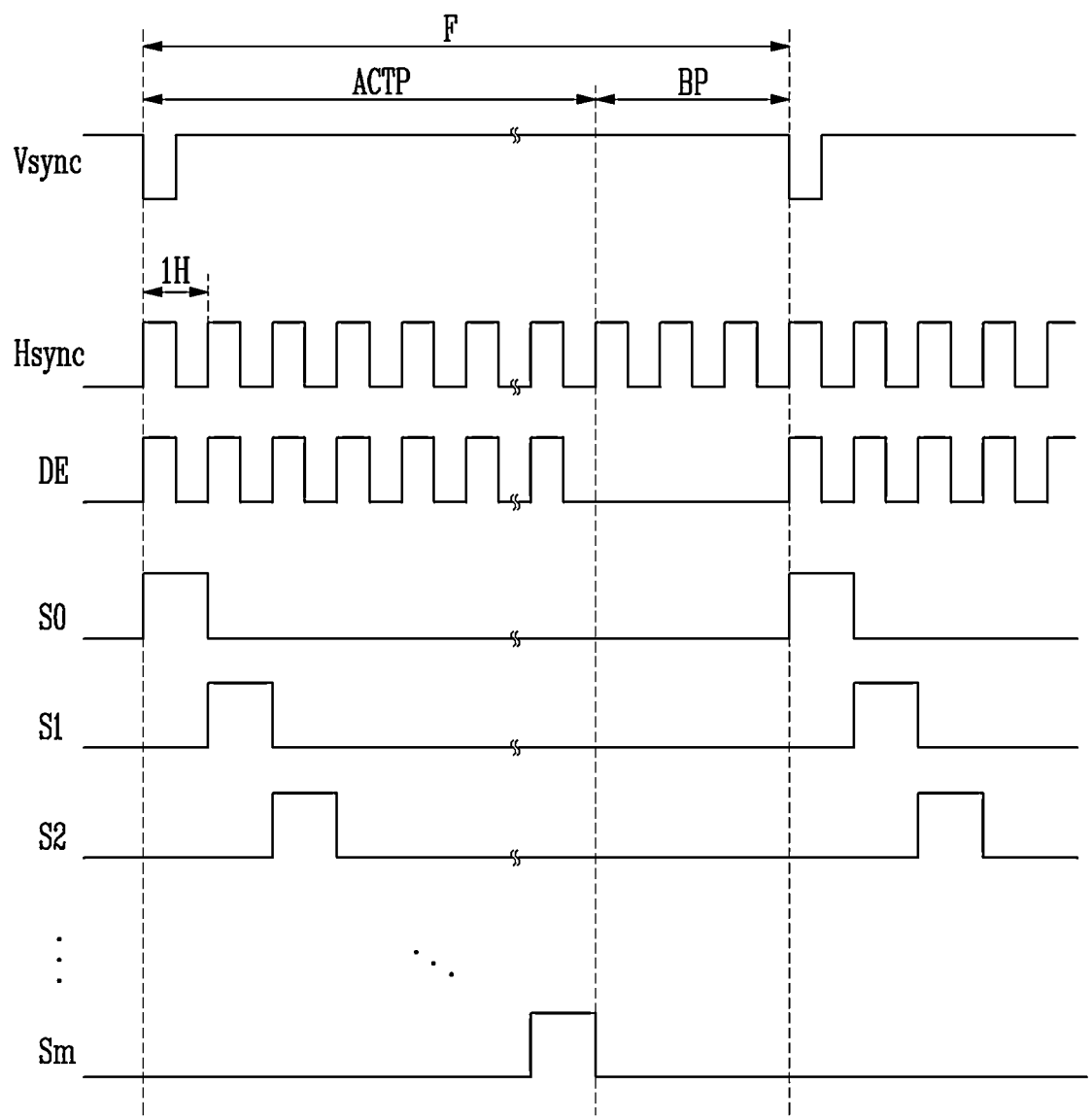
FIG. 1B is a timing diagram of signals generated in a display device according to an embodiment of the disclosure.

FIG. 1A is a block diagram illustrating a display device according to an embodiment of the disclosure. FIG. 1B is a timing diagram of signals generated in a display device according to an embodiment of the disclosure.

Referring to FIG. 1A, an embodiment of the display device 1000 may include a display module 10 and a processor 20.

In an embodiment, a transceiver device TSCV of FIG. 7A or FIG. 7B, which will be described later, may perform communication and data transmission/reception between the display module 10 and the processor 20.

The display module 10 may include a timing controller 11, a data driver 12, a scan driver 13, a pixel unit 14, and an emission driver 15. In an embodiment, functional units of the display module 10 may be integrated into a single integrated circuit ("IC"), integrated into a plurality of ICs, or mounted on a display substrate according to a specification of the display device. In an embodiment, the timing controller 11 and the data driver 12 may be integrated into a single IC to configure one display driver 100. In such an embodiment, the display driver 100 may be referred to as a timing controller embedded driver IC ("TED"), which will be described later in detail. According to a type, the display driver 100 may further include at least one of the scan driver 13 and the emission driver 15.

The processor 20 may correspond to at least one selected from a graphics processing unit ("GPU"), a central processing unit ("CPU"), an application processor ("AP"), and the like. In an embodiment, the processor 20 may output image data to be used in the display module 10.

The processor 20 may include a transmitter TXD of FIG. 7A or FIG. 7B, which will be described later. In an embodiment, the timing controller 11, the data driver 12, or the display driver 100 may include a receiver RXD of FIG. 7A or 7B, which will be described later.

The timing controller 11 may receive grayscales and timing signals for each display frame period from the processor 20. The timing signals may include a vertical synchronization signal Vsync, a horizontal synchronization signal Hsync, a data enable signal DE, and the like.

The vertical synchronization signal Vsync may include a plurality of pulses, and may indicate that a previous frame period is ended and a current frame period is started based on a time point at which each of pulses is generated. In the vertical synchronization signal Vsync, an interval between adjacent pulses may correspond to one frame period. The horizontal synchronization signal Hsync may include a plurality of pulses, and may indicate that a previous horizontal period is ended and a new horizontal period is started based on a time point at which each of pulses is generated. The data enable signal DE may indicate that image data is supplied in a horizontal period. The image data may be supplied in a pixel row unit in the horizontal periods in response to the data enable signal. Image data corresponding to one frame may be referred to as one input image.

The timing controller 11 may provide rendered or non-rendered grayscales to the data driver 12. In addition, the timing controller 11 may provide a data driving control signal to the data driver 12.

The timing controller 11 may provide a scan driving control signal to the scan driver 13 and may provide an emission driving control signal to the emission driver 15.

The data driver 12 may generate data voltages (that is, data signals) to be provided to data lines DL1, DL2, DL3, DL4, . . . , and DLn (where, n is an integer greater than 0) using the grayscales and the data driving control signal received from the timing controller 11.

The scan driver 13 may generate scan signals S0, S1, S2, . . . , and Sm (where, m is an integer greater than 0) to be provided scan lines SL0, SL1, SL2, . . . , and SLm, respectively, using the scan driving control signal (for example, a clock signal, a scan start signal, and the like) received from the timing controller 11. The scan driver 13 may sequentially supply the scan signals S0, S1, S2, . . . , and Sm including a pulse of a turn-on level to the scan lines SL0, SL1, SL2, . . . , and SLm.

The emission driver 15 may generate emission control signals to be provided to emission control lines EL1, EL2, EL3, . . . , and ELo (where, o is an integer greater than 0) using the emission driving control signal (for example, a clock signal, an emission control start signal, and the like) received from the timing controller 11. The emission driver 15 may sequentially supply the emission control signals to the emission control lines EL1, EL2, EL3, . . . , and ELo.

The pixel unit 14 includes pixels PXij (where i is a positive integer less than or equal to m, and j is a positive integer less than or equal to n). The pixel PXij may be connected to corresponding data line, scan line, and emission control line. The pixel PXij may emit light with a luminance corresponding to the data signal.

Referring to FIGS. 1A and 1B, one frame period F may include an active period ACTP and a vertical blank period BP. For convenience of description, in FIG. 1B, the vertical blank period BP includes only a back porch period at a time point at which the frame period F is ended, but the disclosure is not limited thereto, and in an embodiment, the vertical blank period BP may further include a front porch period of a time point at which the frame period F is started. In such an embodiment, the front porch period may mean a period between a time point at which the frame period F is started and a time point at which an input of the data signal is started, and the back porch period may mean a period between a time point at which the input of the data signal is ended and a time point at which the frame period F is ended.

The vertical synchronization signal Vsync defines the frame period F, and the horizontal synchronization signal Hsync defines one horizontal period 1H. The horizontal synchronization signal Hsync may include pulses having a predetermined interval (for example, one horizontal period 1H) in the active period ACTP and the vertical blank period BP.

During the active period ACTP, the data enable signal DE may include a number of pulses corresponding to the number of scan lines SL0, SL1, SL2, . . . , and SLm. During the vertical blank period BP, the data enable signal DE may be maintained in a predetermined level (for example, a low level).

The scan signals S0, S1, S2 . . . , and Sm are signals generated by the scan driver 13 and provided to the scan lines SL0, SL1, SL2, . . . , and SLm. The scan signals S0, S1, S2, . . . , and Sm are sequentially activated to a high level during one frame period F. In one embodiment, For example, while the scan signal S1 provided to the scan line SL1 is in a high level, the data signals may be provided to the pixels PXij of one row connected to the scan line SL1. That is, one horizontal period 1H is a time when the pixels PXij of one row are driven. Hereinafter, embodiments of the transceiver device will be described in detail with reference to FIGS. 2 to 10.

Figure 2:
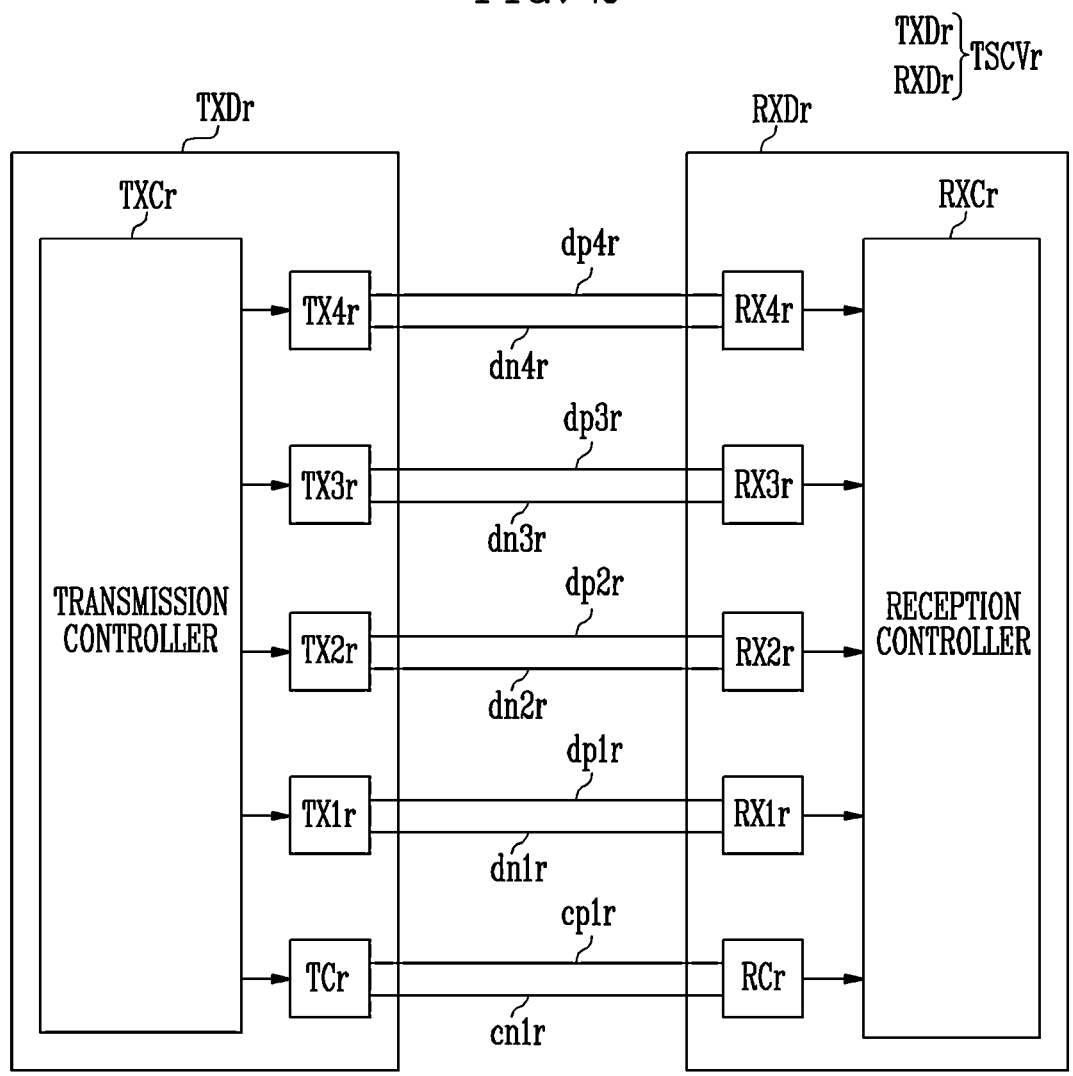
FIGS. 2 and 3 are diagrams illustrating embodiments of a transceiver device.
Figure 3:
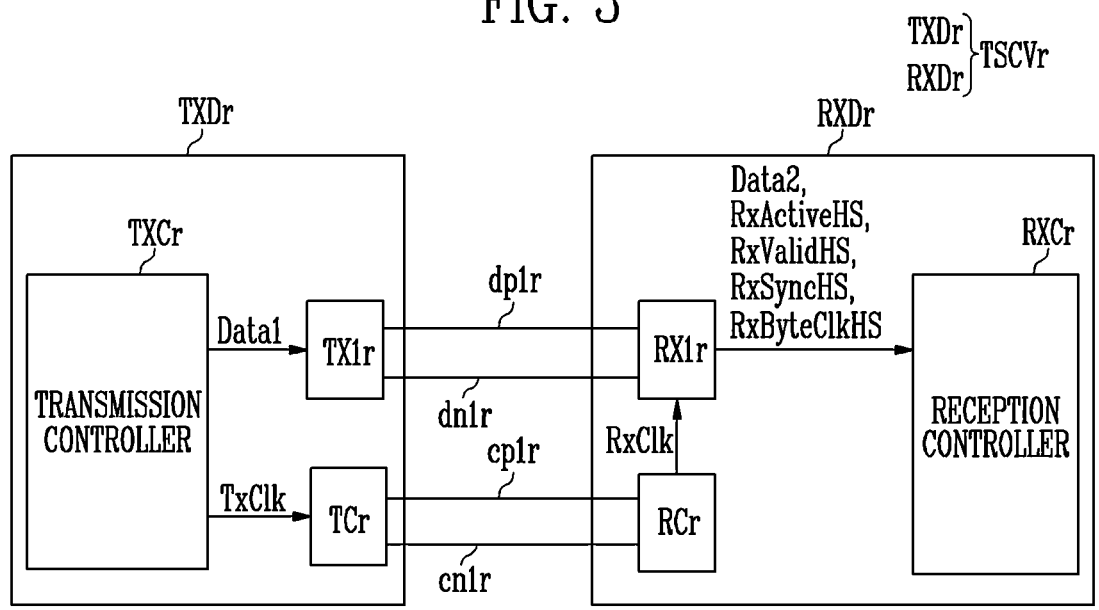

FIGS. 2 and 3 are diagrams illustrating embodiments of the transceiver device.

Referring to FIGS. 2 and 3, an embodiment of the transceiver device TSCVr may include a transmitter TXDr and a receiver RXDr.

In an embodiment, as shown in FIG. 2, the transmitter TXDr may include a transmission controller TXCr, a plurality of data transmitters TX1r, TX2r, TX3r, and TX4r, and a clock transmitter TCr. The receiver RXDr may include a reception controller RXCr, a plurality of data receivers RX1r, RX2r, RX3r, and RX4r, and a clock receiver RCr.

The first data transmitter TX1r may be connected to the first data receiver RX1r through a first line dp1r (or a first data lane) and a second line dn1r (or a second data lane). The first data transmitter TX1r and the first data receiver RX1r may be referred to as a first data channel. The second data transmitter TX2r may be connected to the second data receiver RX2r through a first line dp2r and a second line dn2r. The second data transmitter TX2r and the second data receiver RX2r may be referred to as a second data channel. The third data transmitter TX3r may be connected to the third data receiver RX3r through a first line dp3r and a second line dn3r. The third data transmitter TX3r and the third data receiver RX3r may be referred to as a third data channel. The fourth data transmitter TX4r may be connected to the fourth data receiver RX4r through a first line dp4r and a second line dn4r. The fourth data transmitter TX4r and the fourth data receiver RX4r may be referred to as a fourth data channel.

The clock transmitter TCr may be connected to the clock receiver RCr through a first clock line cp1r (or a first clock lane) and a second clock line cn1r (or a second clock lane). The clock transmitter TCr and the clock receiver RCr may be referred to as a clock channel.

The data transmitters TX1r, TX2r, TX3r, and TX4r, the clock transmitter TCr, the data receivers RX1r, RX2r, RX3r, and RX4r, and the clock receiver RCr may correspond to a physical layer and a data link layer of an OSI 7 layer model, may correspond to a network interface of a TCP/IP protocol, or may correspond to a physical layer of a mobile industry processor interface ("MIPI") protocol. The physical layer of the MIPI protocol may be configured according to various predetermined specifications, such as D-PHY, C-PHY, and M-PHY.

Hereinafter, for convenience of description, embodiments where the plurality of data transmitters TX1r, TX2r, TX3r, and TX4r, the clock transmitter TCr, the plurality of data receivers RX1r, RX2r, RX3r, and RX4r, and the clock receiver RCr are configured according to the D-PHY specification among the physical layers of the MIPI protocol will be described in detail.

The transmission controller TXCr and the reception controller RXCr may correspond to a network layer and a transport layer of the OSI 7 layer model, may correspond to the Internet and transport of the TCP/IP protocol, or may correspond to a protocol layer of the MIPI protocol. The protocol layer of the MIPI protocol may be configured according to various predefined specifications such as a display serial interface ("DSI") and a camera serial interface ("CSI"). Hereinafter, for convenience of description, embodiments where the transmission controller TXCr and the reception controller RXCr are configured according to the DSI specification among the protocol layers of the MIPI protocol will be described in detail.

In an embodiment, the transmission controller TXCr, the data transmitters TX1r, TX2r, TX3r, and TX4r, and the clock transmitter TCr may be configured separately from each other in hardware, or may have a configuration in which at least two or more thereof are integrated in hardware. In an alternative embodiment, the transmission controller TXCr, the data transmitters TX1r, TX2r, TX3r, and TX4r, and the clock transmitter TCr may be configured separately from each other in software, or may have a configuration in which at least two or more thereof are integrated in software.

According to an embodiment, the transmitter TXDr may be configured as a part (hardware or software) of another controller (for example, an AP, a GPU, a CPU, or the like), or may be configured as independent hardware (for example, a transmission dedicated IC).

The reception controller RXCr, the data receivers RX1r, RX2r, RX3r, and RX4r, and the clock receiver RCr may be configured separately from each other in hardware, or may have a configuration in which at least two or more thereof are integrated in hardware. The reception controller RXCr, the data receivers RX1r, RX2r, RX3r, and RX4r, and the clock receiver RCr may be configured separately from each other in software, or may have a configuration in which at least two or more thereof are integrated in software.

According to an embodiment, the receiver RXDr may be configured as a part (hardware or software) of another controller (for example, a timing controller, a TED, a driver IC ("D-IC"), or the like included in the display device), or may be configured as independent hardware (for example, a reception dedicated IC).

In an embodiment, as shown in FIG. 2, the transceiver device TSCVr may include four data channels, and the four data channels may transmit and receive data independent of each other. The four data channels may share a clock signal provided to one clock channel.

In an alternative embodiment, as shown in FIG. 3, the transceiver device TSCVr including a single data channel may be provided. In one embodiment, for example, the transmitter TXDr may include a single first data transmitter TX1r, and the receiver RXDr may include a single first data receiver RX1r.

The transmission controller TXCr may provide first data Data1 to the first data transmitter TX1r and provide a transmission clock signal TxClk to the clock transmitter TCr.

The first data transmitter TX1r may transmit the first data Data1 through the first line dp1r and the second line dn1r. In such an embodiment, the first data transmitter TX1r may transmit other data by adding the other data before and after (or prior to and subsequent to) the first data Data1 according to a predetermined protocol.

The clock transmitter TCr may transmit the transmission clock signal TxClk through the first clock line cp1r and the second clock line cn1r.

The clock receiver RCr may provide a reception clock signal RxClk received through the first clock line cp1r and the second clock line cn1r to the first data receiver RX1r.

The first data receiver RX1r may sample the data received through the first line dp1r and the second line dn1r based on the reception clock signal RxClk. The first data receiver RX1r may provide second data Data2 including the same payload as the first data Data1 to the reception controller RXCr. In an embodiment, the first data receiver RX1r may provide a plurality of control signals RxActiveHS, RxValidHS, RxSyncHS, and RxByteClkHS according to a protocol to the reception controller RXCr.

Figure 4:
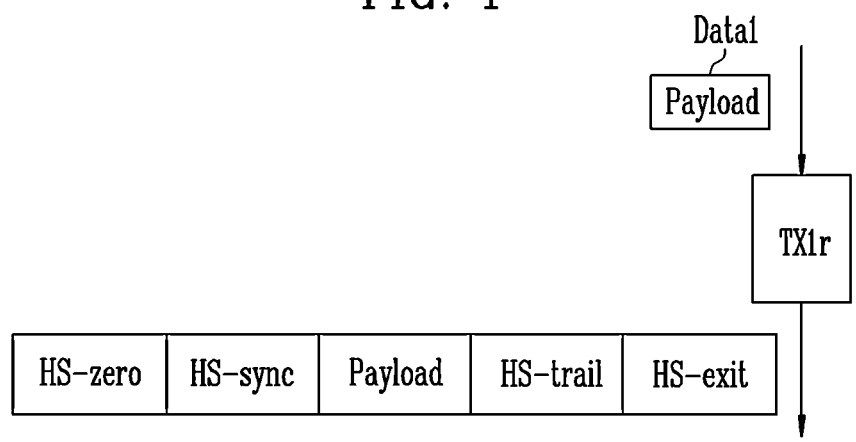
FIGS. 4 and 5 are diagrams illustrating an embodiment of an operation of a transmitter included in the transceiver device of FIGS. 2 and 3.
Figure 5:
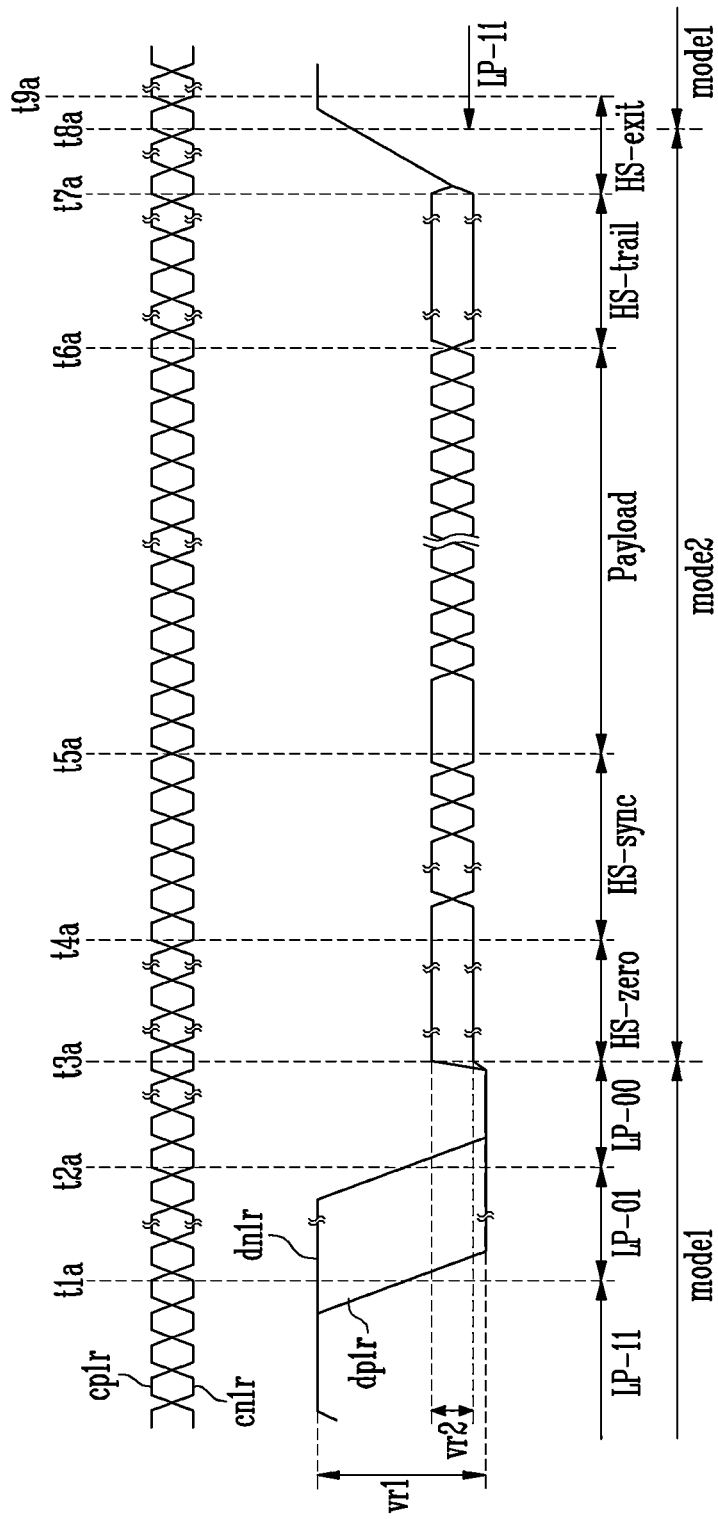

FIGS. 4 and 5 are diagrams illustrating an embodiment of an operation of the transmitter included in the transceiver device of FIGS. 2 and 3.

Referring to FIGS. 2, 4, and 5, an embodiment of the transmitter (for example, the first data transmitter TX1r) may transmit data by adding other data before and after (or prior to and subsequent to) a payload Payload according to a predetermined protocol.

In an embodiment, as shown in FIG. 4, the first data transmitter TX1r may receive the first data Data1 including the payload Payload. The first data Data1 may include image information and the like. In an embodiment, the first data transmitter TX1r may sequentially transmit a first pattern HS-zero, a second pattern HS-sync, the payload Payload, a third pattern HS-trail, and a fourth pattern HS-exit based on the MIPI protocol.

In an embodiment, as shown in FIG. 5, the transmitter TXDr (for example, the first data transmitter TX1r) may transmit signals having a first voltage range vr1 to the first line dp1r and the second line dn1r in a first mode mode1. In an embodiment, the transmitter TXDr may transmit signals having a second voltage range vr2 less than the first voltage range vr1 to the first line dp1r and the second line dn1r in a second mode mode2.

In one embodiment, for example, an upper limit of the first voltage range vr1 may be greater than an upper limit of the second voltage range vr2, and a lower limit of the first voltage range vr1 may be less than or equal to a lower limit of the second voltage range vr2. In an embodiment where the MIPI protocol is applied to the transceiver device TSCVr, the first mode mode1 may be a low power ("LP") mode, and the second mode mode2 may be a high speed ("HS") mode.

In the first mode mode1, the first line dp1r and the second line dn1r may be used in a single-ended method (or operate using a single-ended signaling) independently of each other. That is, the signals transmitted to each of the first line dp1r and the second line dn1r in the first mode mode1 may be the same or different from each other. In one embodiment, for example, a combination of the first line dp1r and the second line dn1r in the first mode mode1 may have one of four states (for example, dp1r high & dn1r high, dp1r high & dn1r low, dp1r low & dn1r high, and dp1r low & dn1r low).

In the second mode mode2, the first line dp1r and the second line dn1r may be used in a differential method (or operate using a differential signaling). That is, the signals transmitted to each of the first line dp1r and the second line dn1r in the second mode mode2 may be different from each other. Therefore, the combination of the first line dp1r and the second line dn1r in the second mode mode2 may have one of two states (for example, dp1r high & dn1r low, and dp1r low & dn1r high).

In order to inform a switch from the first mode mode1 to the second mode mode2, the transmitter TXDr may transmit predefined patterns (for example, a pattern LP-11, a pattern LP-01, and a pattern LP-00) to the first line dp1r and the second line dn1r. In one embodiment, for example, the transmitter TXDr may maintain the signals applied to the first line dp1r and the second line dn1r at a logic high level before a first time point t1a (LP-11 pattern). When a voltage level of the supplied signal is greater than a first predefined threshold voltage level, the transmitted signal may be determined as a logic high level, and when the voltage level of the supplied signal is less than a predefined second threshold voltage level, the transmitted signal may be determined as a logic low level.

Thereafter, the transmitter TXDr may change the signal of the first line dp1r to the logic low level during a period including the time point t1a and maintain the signal of the second line dn1r as the logic high level (that is, the pattern LP-01).

During a period including a second time point t2a, the transmitter TXDr may maintain the signal of the first line dp1r as the logic low level and change the signal of the second line dn1r to the logic low level (that is, the pattern LP-00). Data transmission in the first mode mode1 is ended through the patterns LP-11, LP-01, and LP-00, and the transceiver device TSCVr may indicate that transceiver device TSCVr is in a transition state for being switched from the first mode mode1 to the second mode mode2.

In the second mode mode2, the transmitter TXDr may sequentially transmit the first pattern HS-zero, the second pattern HS-sync, the payload Payload, the third pattern HS-trail, and fourth the pattern HS-exit to the receiver RXDr. In one embodiment, for example, the transmitter TXDr may transmit the first pattern HS-zero during a period from a third time point t3a to a fourth time point t4a, transmit the second pattern HS-sync during a period from the fourth time point t4a to a fifth time point t5a, transmit the payload Payload during a period from the fifth time point t5a to a sixth time point t6a, transmit the third pattern HS-trail during a period from the sixth time point t6a to a seventh time point t7a, and transmit the fourth pattern HS-exit after the seventh time point t7a. Each of the first to fourth patterns HS-zero, HS-sync, HS-trail, and HS-exit may be a data pattern of a digital format.

The first pattern HS-zero may be a pattern for informing a waiting period after entering from the first mode mode1 to the second mode mode2. In one embodiment, for example, the first pattern HS-zero may be a pattern in which 0 is repeated.

The second pattern HS-sync may be a pattern informing a transmission start of the payload Payload. In one embodiment, for example, the second pattern HS-sync may have OxB8h value or 00011101 value.

The payload Payload may be effective data to be transmitted. Therefore, the payload Payload may include variable values other than a predetermined pattern. In one embodiment, for example, the payload Payload may include image data.

The third pattern HS-trail may be a pattern informing a transmission end of the payload Payload. The third pattern HS-trail may be a pattern in which a value opposite to last data of the payload Payload is repeated. In one embodiment, for example, when the last data (bit) of the payload Payload is 0, the third pattern HS-trail may be a pattern in which 1 is repeated. Alternatively, when the last data (bit) of the payload Payload is 1, the third pattern HS-trail may be a pattern in which 0 is repeated.

The fourth pattern HS-exit may be a pattern informing that the second mode mode2 is ended and the first mode mode1 is started. The fourth pattern HS-exit may not be configured of a specific bit, but may be a transitional pattern in which a voltage is increased to exceed the second voltage range vr2.

The transmitter TXDr may change the signals applied to the first line dp1r and the second line dn1r to the logic high level during a period from an eighth time point t8a to a ninth time point t9a (that is, the pattern LP-11). Accordingly, the transmitter TXDr may inform that the second mode mode2 is ended and the first mode mode1 is started.

The transmitter TXDr (in particular, the clock transmitter TCr) may transmit the transmission clock signal TxClk to the clock receiver RCr of the receiver RXDr in a differential mode through the first clock line cp1r and the second clock line cn1r in the first mode mode1 and the second mode mode2. The first data receiver RX1r may sample data received in the second mode mode2 based on the reception clock signal RxClk (refer to FIG. 3).

Figure 6:
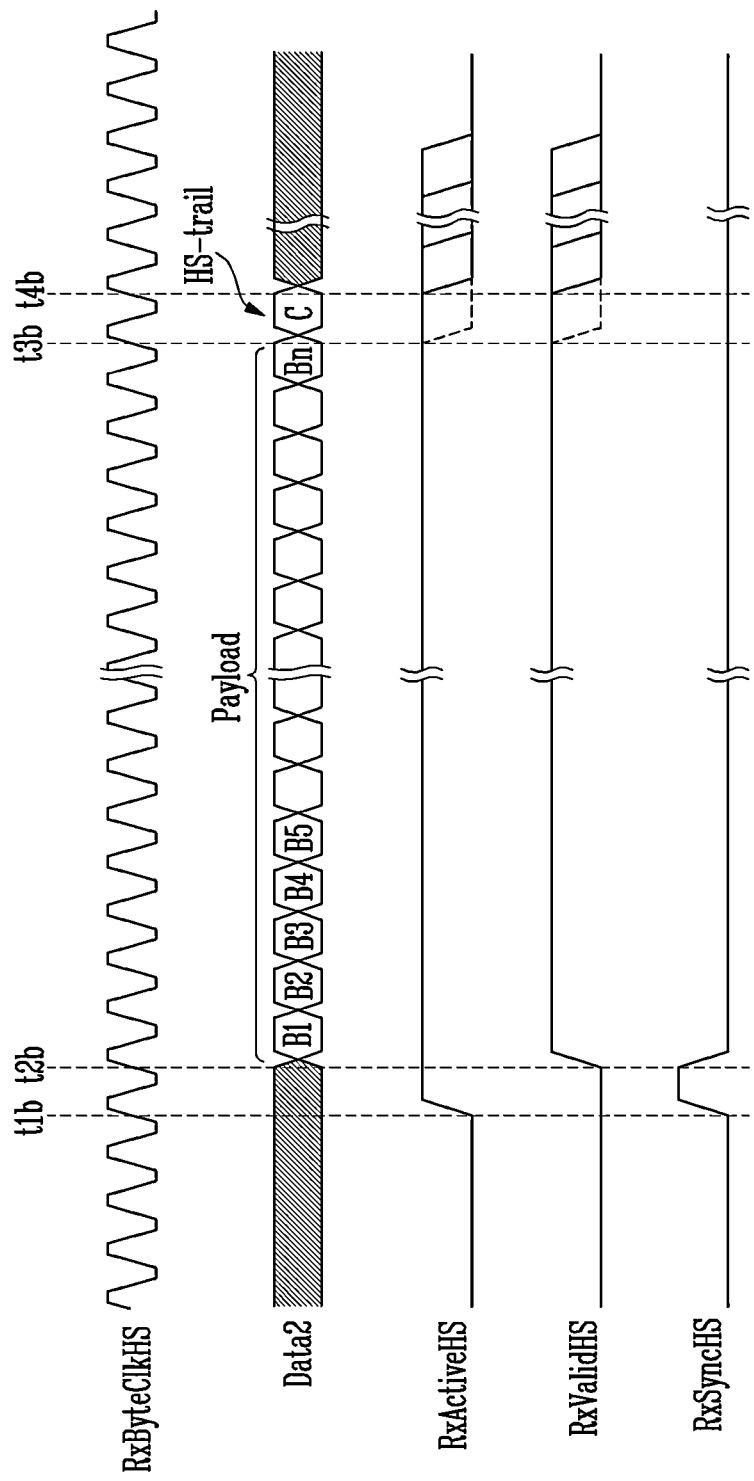
FIG. 6 is a diagram illustrating an embodiment of an operation of a receiver included in the transceiver device of FIGS. 2 and 3.

FIG. 6 is a diagram illustrating an embodiment of an operation of the receiver included in the transceiver device of FIGS. 2 and 3.

Referring to FIGS. 2 and 6, an embodiment of the receiver RXDr (for example, the first data receiver RX1r) may generate the second data Data2 and the signals RxActiveHS, RxValidHS, RxSyncHS, and RxByteClkHS according to a preset communication protocol (for example, the MIPI protocol).

The clock signal RxByteClkHS may be a high speed transmission byte clock signal for informing a data transmission unit of a byte unit. In one embodiment, for example, the control signal RxByteClkHS may indicate that one byte of the second data Data2 is transmitted for each one cycle of the control signal RxByteClkHS.

The second data Data2 may include additional information C and the payload Payload configured of byte units B1, B2, B3, B4, B5, . . . , and Bn. In one embodiment, for example, the additional information C may be information corresponding to the third pattern HS-trail from a time point t3b to a time point t4b. In one embodiment, for example, the additional information C may be 8 bit information in which 0 is repeated or 1 is repeated.

In one embodiment, for example, the first data receiver RX1r may parallelize (for example, parallelize to 8 lines) the sampled payload Payload and the third pattern HS-trail through a de-serializer, and transmit the parallelized second data Data2 to the reception controller RXCr.

At a first time point t1b, a logic level of the first reception control signal RxActiveHS may be changed from a first level (for example, the logic low level) to a second level (for example, the logic high level). The first time point t1b may correspond to one cycle before the clock signal RxByteClkHS from a second time point t2b at which transmission of the second data Data2 is started. The first data receiver RX1r may determine the first time point t1b, based on the fifth time point t5a of FIG. 5 at which the second pattern HS-sync is ended.

At the second time point t2b, a logic level of the second reception control signal RxValidHS may be changed from the first level to the second level. At the second time point t2b, an output of first data B1 of the payload Payload of the second data Data2 may be started. The second time point t2b may be one period after the clock signal RxByteClkHS from the first time point t1b.

At the first time point t1b, a logic level of the third reception control signal RxSyncHS may be changed from the first level to the second level, and at the second time point t2b, the logic level of the third reception control signal RxSyncHS may be changed from the second level to the first level. The third reception control signal RxSyncHS may define a transition interval between the first reception control signal RxActiveHS and the second reception control signal RxValidHS, and an output and a function may be determined according to the MIPI protocol.

Figure 7A:
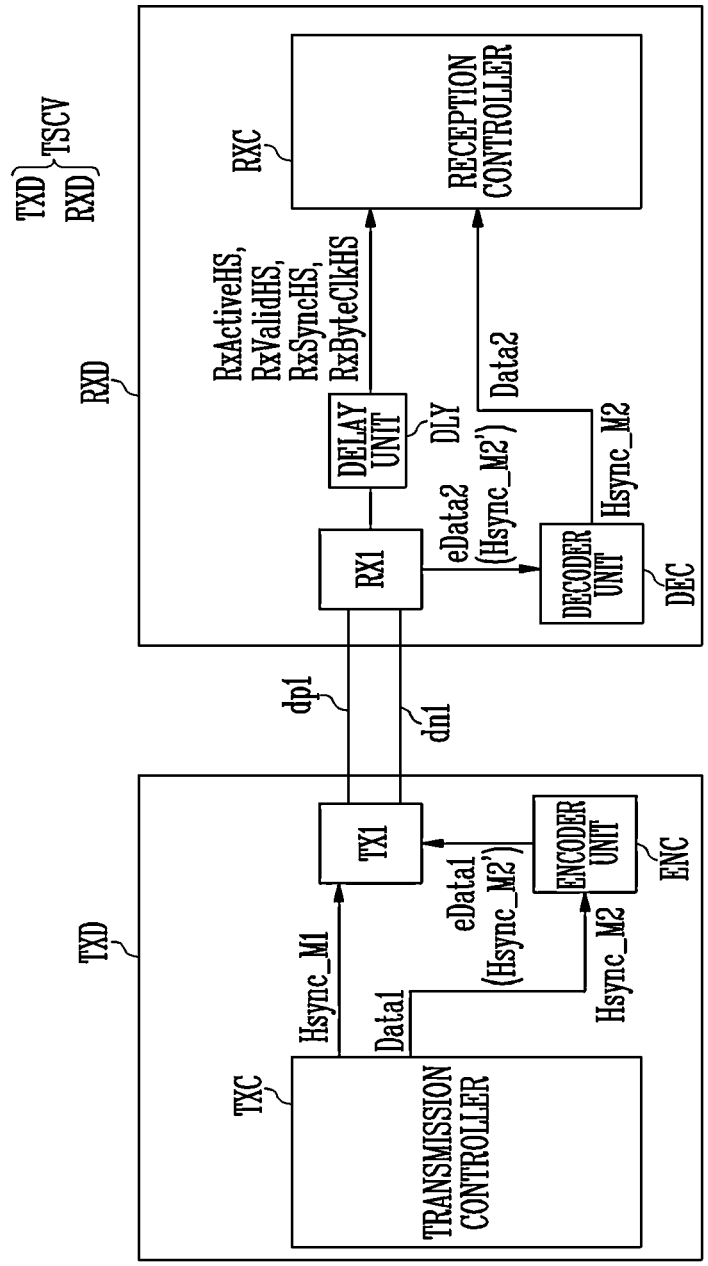
FIGS. 7A and 7B are diagrams illustrating a transceiver device according to embodiments of the disclosure.
Figure 7B:
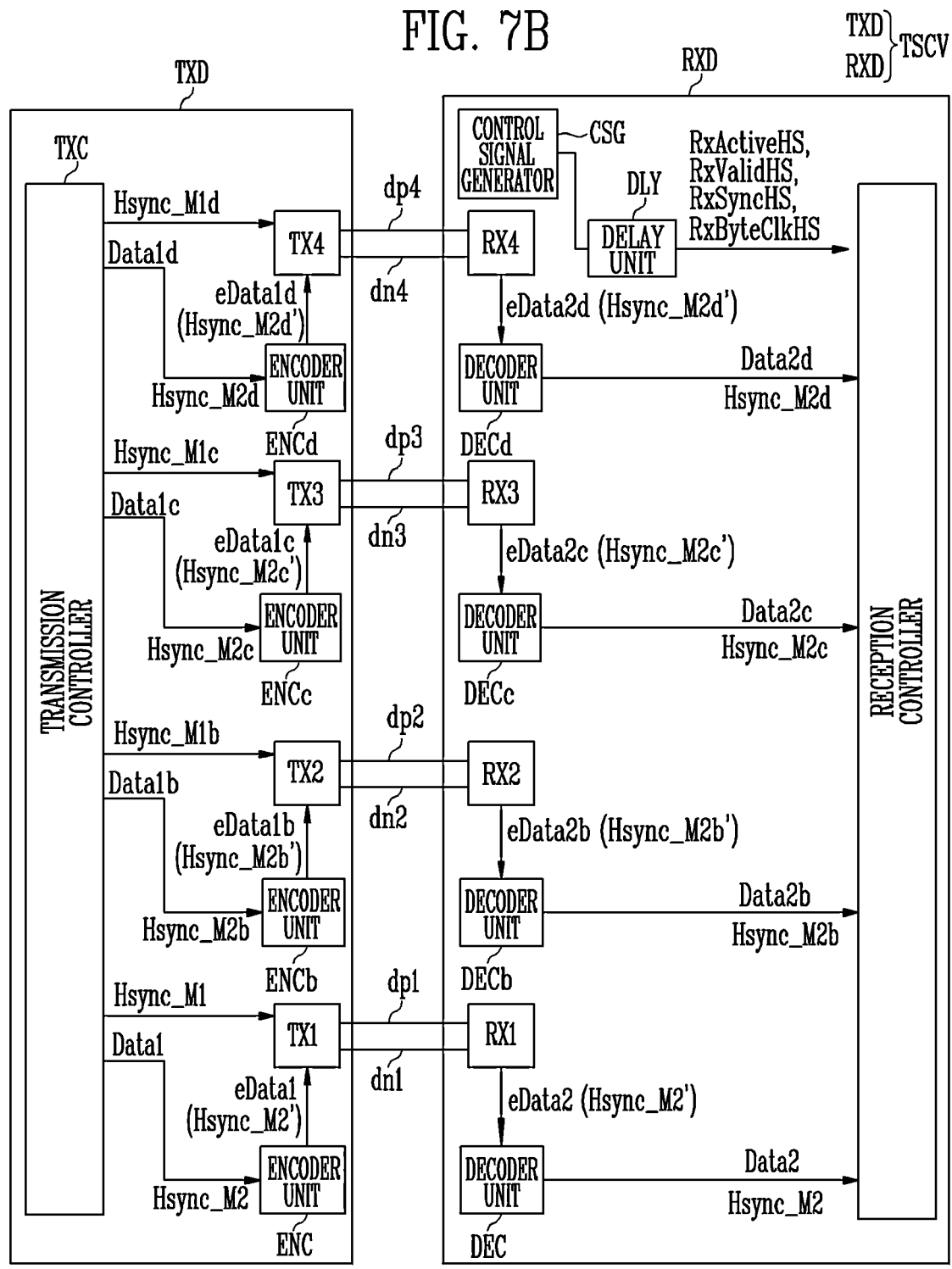

FIGS. 7A and 7B are diagrams illustrating a transceiver device according to embodiments of the disclosure.

The transceiver device TSCV of FIGS. 7A and 7B has a configuration substantially the same as or similar to that of the transceiver device TSCVr of FIGS. 2 and 3 except that the clock transmitter TCr, the clock receiver RCr, and the clock lines cp1r and cn1r are removed, and an encoder unit ENC, a decoder unit DEC, and a delay unit DLY are added. The same or like elements shown in FIGS. 7A and 7B have been labeled with the same reference characters as used above to describe the embodiment of the transceiver device TSCVr shown in FIGS. 2 and 3, and any repetitive detailed description thereof will hereinafter be omitted or simplified.

Referring to FIGS. 7A and 7B, an embodiment of the transceiver device TSCV may include a transmitter TXD and a receiver RXD.

The transmitter TXD may include a transmission controller TXC (for example, a transmission link module), a first data transmitter TX1 (for example, a transmission D-PHY module), and the encoder unit ENC. The receiver RXD may include a reception controller RXC (for example, a reception link module), a first data receiver RX1 (for example, a reception D-PHY module), and the decoder unit DEC.

The first data transmitter TX1 may be connected to the first data receiver RX1 through a first line dp1 and a second line dn1. The first data transmitter TX1 and the first data receiver RX1 may be referred to as a first data channel. Hereinafter, for convenience of description, embodiments where the first data transmitter TX1 and the first data receiver RX1 are configured according to the D-PHY specification among the physical layers of the MIPI protocol, and the transmission controller TXC and the reception controller RXC are configured according to the DSI specification among the protocol layers of the MIPI protocol will be described in detail. However, the first data transmitter TX1, the first data receiver RX1, the transmission controller TXC, and the reception controller RXC are not limited thereto, and may be applied to interfaces of various standards.

In an embodiment, the transmission controller TXC, the first data transmitter TX1, and the encoder unit ENC may be configured separately from each other in hardware, or may have a configuration in which two or more thereof are integrated in hardware. In an embodiment, the transmission controller TXC, the first data transmitter TX1, and the encoder unit ENC may be configured separately from each other in software, or may have a configuration in which two or more thereof are integrated in software. In an embodiment, the transmitter TXD may be configured as a part (hardware or software) of a predetermined processing device (for example, an AP, a GPU, a CPU, or the like), or may be configured as independent hardware (for example, a transmission dedicated IC).

In an embodiment, the reception controller RXC, the first data receiver RX1, the decoder unit DEC, and the delay unit DLY may be separately from each other in hardware, or may have a configuration in which two or more thereof are integrated in hardware. In an embodiment, the reception controller RXC, the first data receiver RX1, the decoder unit DEC, and the delay unit DLY may be configured separately from each other in software, or may have a configuration in which two or more thereof are integrated in software. In an embodiment, the receiver RXD may be configured as a part (hardware or software) of a predetermined device (for example, a timing controller, a TED, a D-IC, or the like), or may be configured as independent hardware (for example, a reception dedicated IC).

The transmission controller TXC may provide the first data Data1 including an original payload to the encoder unit ENC. The encoder unit ENC may encode the first data Data1 to generate first encoded data eData1 including a first payload ePayload (or an encoded payload), and provide the first encoded data eData1 to the first data transmitter TX1. The first data transmitter TX1 may transmit other data by adding the other data before and after (or prior to and subsequent to) the first encoded data eData1 according to a predetermined protocol.

In an embodiment, in a frequency hopping period FHP to be described later with reference to FIG. 12, the transmission controller TXC may generate a horizontal synchronization signal Hsync_M1 in the first mode, and directly transmit the horizontal synchronization signal Hsync_M1 to the first data transmitter TX1. In periods BP1 and BP2 except for the frequency hopping period FHP of the vertical blank period BP (shown in FIG. 12), the transmission controller TXC may a horizontal synchronization signal Hsync_M2 in the second mode, and transmit the horizontal synchronization signal Hsync_M2 to the encoder unit ENC, and the encoder unit ENC may encode the horizontal synchronization signal Hsync_M2 to generate the first payload ePayload of FIG. 8 (or horizontal synchronization data Hsync_M2'), and generate the first encoded data eData1 of FIG. 8 by adding predetermined data before and after (or prior to and subsequent to) the first payload ePayload of FIG. 8 (or the horizontal synchronization data Hsync_M2'). In one embodiment, for example, the first encoded data eData1 of FIG. 8 may sequentially include a clock training pattern CLK-T of FIG. 8, a start pattern STP of FIG. 8, the first payload ePayload of FIG. 8, and an end pattern EDP of FIG. 8.

The first data receiver RX1 may generate a clock signal RxByteClkHS using the first encoded data eData1 and sample the data received through the first line dp1 and the second line dn1 based on the generated clock signal RxByteClkHS. In one embodiment, for example, the first data receiver RX1 may include a clock data recovery circuit.

The first data receiver RX1 may provide second encoded data eData2 including substantially the same first payload as the first encoded data eData1 to the decoder unit DEC.

The decoder unit DEC may decode the second encoded data eData2 to generate the second data Data2 including the same payload as the first data Data1, and provide the second data Data2 to the reception controller RXC.

Figure 12:
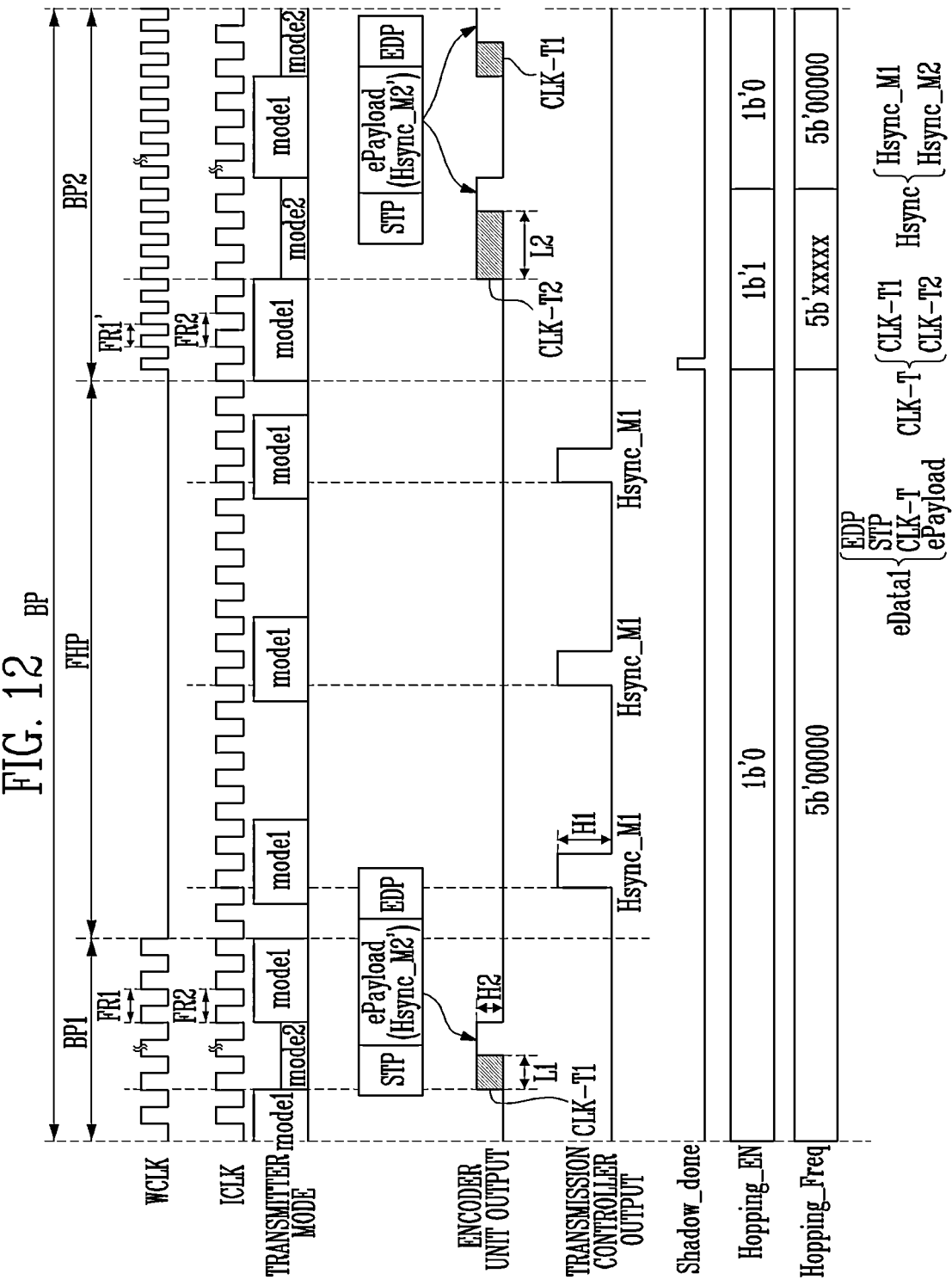
FIG. 12 is a diagram illustrating an operation of the transmitter in a vertical blank period.

In an embodiment, in the periods BP1 and BP2 of FIG. 12 except for the frequency hopping period of the horizontal blank period BP of FIG. 12, the first data receiver RX1 may provide the second encoded data eData2 including the first payload ePayload of FIG. 8 (or the horizontal synchronization data Hsync_M2') substantially the same as the first encoded data eData1 to the decoder unit DEC.

The decoder unit DEC may decode the second encoded data eData2 to generate the second data Data2 including the same payload as the first data Data1 and a horizontal synchronization signal Hsync_M2, and provide the second data Data2 and the horizontal synchronization signal Hsync_M2 to the reception controller RXC.

In an embodiment, the first data receiver RX1 may generate the plurality of signals RxActiveHS, RxValidHS, RxSyncHS, and RxByteClkHS according to a protocol applied to the transceiver device TSCV. In such an embodiment, the delay unit DLY may delay the signals RxActiveHS, RxValidHS, RxSyncHS, and RxByteClkHS by a decoding time and provide the signals RxActiveHS, RxValidHS, RxSyncHS, and RxByteClkHS to the reception controller RXC. The decoding time may be a time used for the decoder unit DEC to decode the second encoded data eData2 to generate the second data Data2.

According to an embodiment, as shown in FIG. 7A, the transceiver device TSCV may be configured with a single data channel, but not being limited thereto. Alternatively, the transceiver device TSCV may be configured with a plurality of data channels (for example, four data channels) as shown in FIG. 7B.

In an embodiment, as shown in FIG. 7B, the transmitter TXD may further include second to fourth data transmitters TX2, TX3, and TX4 and corresponding encoder units ENCb, ENCc, and ENCd. The receiver RXD may include second to fourth data receivers RX2, RX3, and RX4 and corresponding decoder units DECb, DECc, and DECd. In such an embodiment, the receiver RXD may further include a control signal generator CSG and the delay unit DLY.

The second data transmitter TX2 may be connected to the second data receiver RX2 through a first line dp2 and a second line dn2. The second data transmitter TX2 and the second data receiver RX2 may be referred to as a second data channel. The third data transmitter TX3 may be connected to the third data receiver RX3 through a first line dp3 and a second line dn3. The third data transmitter TX3 and the third data receiver RX3 may be referred to as a third data channel. The fourth data transmitter TX4 may be connected to the fourth data receiver RX4 through a first line dp4 and a second line dn4. The fourth data transmitter TX4 and the fourth data receiver RX4 may be referred to as a fourth data channel. The plurality of data channels may transmit and receive data independent of each other.

Since an operation of the transmission controller TXC that generates horizontal synchronization signals Hsync_M1$b$, Hsync_M1$c$, and Hsync_M1$d$ in the first mode and directly transmits the horizontal synchronization signals Hsync_M1$b$, Hsync_M1$c$, and Hsync_M1$d$ to each of the second to fourth data transmitters TX2, TX3, and TX4 in the frequency hopping period FHP is the same as the operation of the transmission controller TXC described above that generates the horizontal synchronization signal Hsync_M1 in the first mode and directly transmits the horizontal synchronization signal Hsync_M1 to the first data transmitter TX1 in the frequency hopping period FHP, any repetitive detailed description thereof will be omitted.

Since an operation of the transmission controller TXC that generates horizontal synchronization signals Hsync_M2$b$, Hsync_M2$c$, and Hsync_M2$d$ in the second mode and transmits the horizontal synchronization signals Hsync_M2$b$, Hsync_M2$c$, and Hsync_M2$d$ to each of the encoder units ENCb, ENCc, and ENCd in the periods BP1 and BP2 except for the frequency hopping period of the vertical blank period, and an operation of each of the encoder units ENCb, ENCc, and ENCd that encodes each of the horizontal synchronization signals Hsync_M2$b$, Hsync_M2$c$, and Hsync_M2$d$ to generate the first payload ePayload of FIG. 8 (or horizontal synchronization data Hsync_M2$b$', Hsync_M2$c$', and Hsync_M2$d$'), and generates first encoded data eData1$b$, eData1$c$, and eData1$d$ of FIG. 8 by adding predetermined data before and after (or prior to and subsequent to) the first payload ePayload of FIG. 8 (or the horizontal synchronization data Hsync_M2$b$', Hsync_M2$c$', and Hsync_M2$d$') are the same as the operation of the transmission controller TXC described above that generates the horizontal synchronization signal Hsync_M2 in the second mode and transmits the horizontal synchronization signal Hsync_M2 to the encoder unit ENC in the periods BP1 and BP2 except for the frequency hopping period of the vertical blank period, and the operation of the encoder unit ENC that encodes the horizontal synchronization signal Hsync_M2 to generate the first payload ePayload of FIG. 8 (or the horizontal synchronization data Hsync_M2') and generates the first encoded data eData1 of FIG. 8 by adding predetermined data before and after (or prior to and subsequent to) the first payload ePayload of FIG. 8 (or the horizontal synchronization data Hsync_M2'), any repetitive detailed description thereof will be omitted.

Since an operation of the encoders ENCb, ENCc, and ENCd that encodes data Data1$b$, Data1$c$, and Data1$d$ to generate the encoded data eData1$b$, eData1$c$, and eData1$d$ is substantially the same as an operation of the encoder unit ENC described above, any repetitive detailed description thereof will be omitted.

Since an operation of the decoders DECb, DECc, and DECd that decodes encoded data eData2$b$, eData2$c$, and eData2$d$ (or the horizontal synchronization data Hsync_M2') to generate the data Data2$b$, Data2$c$, and Data2$d$ and the horizontal synchronization signals Hsync_M2$b$, Hsync_M2$c$, and Hsync_M2$d$ is substantially the same as an operation of the decoder unit DEC described above, any repetitive detailed description thereof omitted.

The control signal generator CSG may generate the control signals RxActiveHS, RxValidHS, RxSyncHS, and RxByteClkHS and the clock signal RxByteClkHS using the data received by the first to fourth data receivers RX1, RX2, RX3, and RX4. In one embodiment, for example, the control signal generator CSG may align a timing of the data received by the first to fourth data receivers RX1, RX2, RX3, and RX4, and generate the control signals RxActiveHS, RxValidHS, RxSyncHS, and RxByteClkHS and the clock signal RxByteClkHS based on the aligned data.

The delay unit DLY may delay the control signals RxActiveHS, RxValidHS, RxSyncHS, and RxByteClkHS and the clock signal RxByteClkHS by a decoding time and provide the plurality of control signals RxActiveHS, RxValidHS, RxSyncHS, and RxByteClkHS and the clock signal RxByteClkHS to the reception controller RXC. Here, the decoding time may be a time used for the decoder units DEC, DECb, DECc, and DECd to decode the second encoded data eData2, eData2$b$, eData2$c$, and eData2$d$ to generate the second data Data2, Data2$b$, Data2$c$, and Data2$d$. In one embodiment, for example, when the decoding times of the decoder units DEC, DECb, DECc, and DECd are different from each other, the delay unit DLY may delay an output of at least one of the control signals RxActiveHS, RxValidHS, RxSyncHS, and RxByteClkHS and the clock signal RxByteClkHS based on the slowest decoding time.

In an embodiment, as described above, a clock line connected between the transmitter TXD and the receiver RXD in the transceiver device TSCV communicating based on the MIPI protocol may be omitted (removed). In such an embodiment, clock information (or information on clock signal) may be included (built-in) in the encoded data (for example, eData1, eData1$b$, eData1$c$, and eData1$d$) supplied to the first and second lines dp1 and dn1. Therefore, physical/spatial cost and power consumption due to clock line disposition may be reduced.

Figure 9:
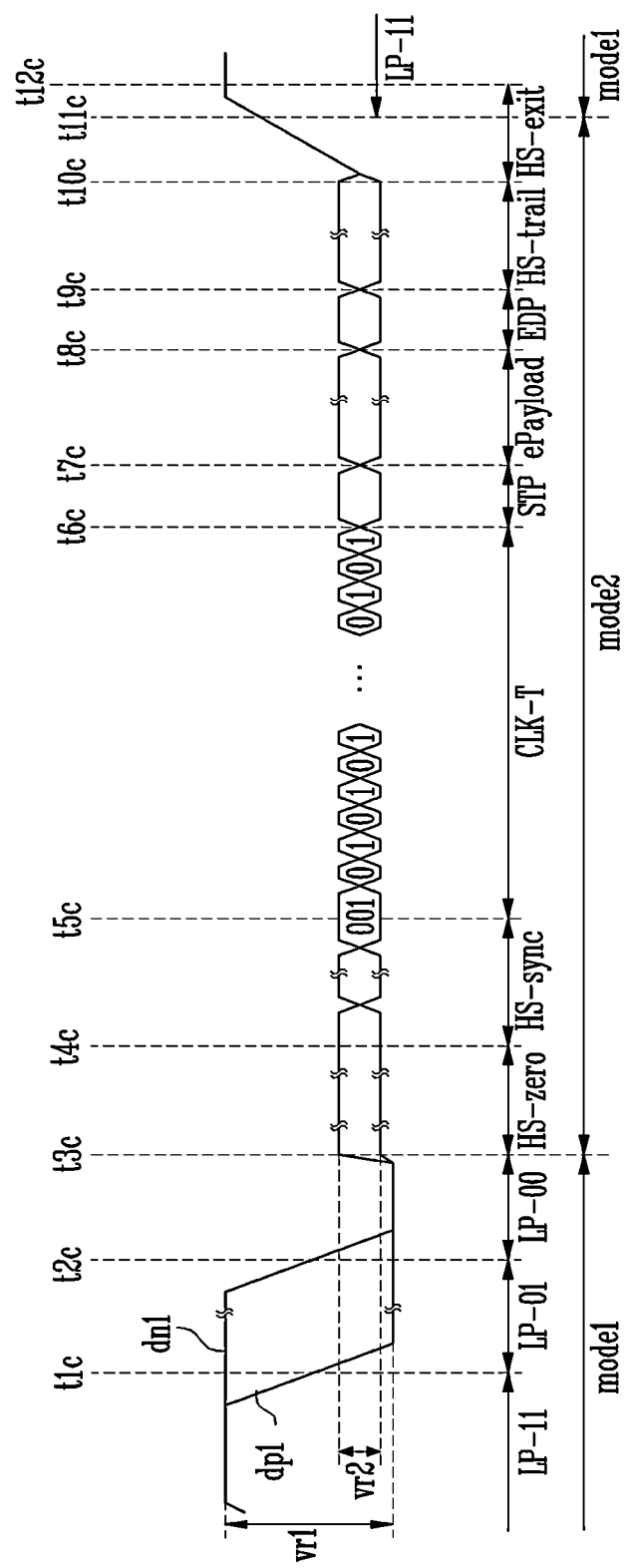

FIGS. 8 and 9 are diagrams illustrating an embodiment of the operation of the transmitter included in the transceiver device of FIGS. 7A and 7B.

Referring to FIGS. 7A, 7B, 8, and 9, the transmitter TXD may transmit data through the first and second lines dp1 and dn1 by adding other data before and after (or prior to and subsequent to) the payload Payload according to a predetermined protocol.

The encoder unit ENC may receive the first data Data1 including the original payload Payload. The encoder unit ENC may encode the original payload Payload to generate the first payload ePayload, and add data before and after (or prior to and subsequent to) the first payload ePayload to generate the first encoded data eData1. In one embodiment, for example, as shown in FIG. 8, the first encoded data eData1 may sequentially include the clock training pattern CLK-T, the start pattern STP, the first payload ePayload, and the end pattern EDP.

The clock training pattern CLK-T may include frequency information of the clock information. The clock training pattern CLK-T may be data used to recover a clock signal in the receiver RXD. The receiver RXD may generate a clock signal having a specific frequency and a specific phase by using the clock information.

In one embodiment, for example, as shown in FIG. 9, the clock training pattern CLK-T may be a pattern in which one 1 and one 0 are repeated alternately with each other (for example, 01010101 . . . ). A frequency and a phase of the clock signal generated by the clock data recovery circuit of the receiver RXD may be undesirably changed by an external factor (noise, temperature, or the like). The receiver RXD may correct the frequency and the phase of the clock signal using the clock training pattern CLK-T.

In an embodiment, the clock training pattern CLK-T may repeatedly include a plurality of successive 0s and a plurality of successive 1s (for example, 00001111000001111 . . . ). Frequency information and phase information indicated by the clock training pattern CLK-T may vary according to the number of plurality of successive 0s or the number of plurality of successive 1s.

The start pattern STP may be a pattern informing a transmission start of the first payload ePayload. The start pattern STP may be a pattern that the first payload ePayload which is in an encoded state may not include (=use inhibited). In one embodiment, for example, the start pattern STP may be configured as 24b' (24 bits) 011100_000000_111111_110001'.

The first payload ePayload may include the clock information. In one embodiment, for example, when there are many successive 0s or many successive 1s in the original payload Payload, since transition of a signal may be small, a phase correction of the clock signal based on clock training may not be sufficiently performed in the first data receiver RX1, and a skew of the clock signal may occur by the clock training. Therefore, the encoder unit ENC may perform encoding so that the number of transitions (a change from 0 to 1 or a change from 1 to 0) of the first payload ePayload is sufficiently great compared to the original payload Payload. In an embodiment, the encoder unit ENC may perform encoding so that the first payload ePayload periodically has a bit of a specific rule.

The end pattern EDP may be a pattern informing a transmission end of the first payload ePayload. The end pattern EDP may be a pattern that the first payload ePayload which is in the encoded state may not include (=use inhibited). In one embodiment, for example, the end pattern EDP may be configured as 24b' (24 bits) 011100_111111_000000_110001'.

The first data transmitter TX1 may receive the first encoded data eData1 including the first payload ePayload. The first data transmitter TX1 may transmit other data by adding the other data before and after (or prior to and subsequent to) the first encoded data eData1 according to a predetermined protocol. In one embodiment, for example, when the predetermined protocol is the MIPI protocol, the first data transmitter TX1 may sequentially transmit the first pattern HS-zero, the second pattern HS-sync, the first encoded data eData1, the third pattern HS-trail, and the fourth pattern HS-exit.

As shown in FIG. 9, the transmitter TXD (in particular, the first data transmitter TX1) may transmit the signals having the first voltage range vr1 to the first line dp1 and the second line dn1 in the first mode mode1. In an embodiment, the transmitter TXD may transmit the signals having the second voltage range vr2 less than the first voltage range vr1 to the first line dp1 and the second line dn1 in the second mode mode2.

In the first mode mode1, the first line dp1 and the second line dn1 may be used in the single-ended method or operate based on a single-ended signaling. That is, the signals transmitted to each of the first line dp1 and the second line dn1 in the first mode mode1 may be the same or different from each other.

In the second mode mode2, the first line dp1 and the second line dn1 may be used in the differential method or operate based on a differential signaling. That is, the signals transmitted to each of the first line dp1 and the second line dn1 in the second mode mode2 are different from each other.

The transmitter TXD may transmit the clock training pattern CLK-T and the first payload ePayload in the second mode mode2.

In an embodiment, the transmitter TXD may transmit the predefined patterns (for example, the pattern LP-11, the pattern LP-01, and the pattern LP-00) to the first line dp1 and the second line dn1 to inform the switch from the first mode mode1 to the second mode mode2.

In one embodiment, for example, the transmitter TXD may maintain the signals applied to the first line dp1 and the second line dn1 as the logic high level before a first time point t1c (LP-11 pattern).

During a period including the first time point t1c, the transmitter TXD may change the signal of the first line dp1 to the logic low level and maintain the signal of the second line dn1 as the logic high level (that is, the pattern LP-01). Next, during a period including a second time point t2c, the transmitter TXD may maintain the signal of the first line dp1 as the logic low level and change the signal of the second line dn1 to the logic low level (that is, the pattern LP-00).

Thereafter, in the second mode mode2, the transmitter TXD may sequentially transmit the first pattern HS-zero, the second pattern HS-sync, the first encoded data eData1, the third pattern HS-trail, and the fourth pattern HS-exit. In one embodiment, for example, the transmitter TXD may transmit the first pattern HS-zero during a period from a third time point t3c to a fourth time point t4c, transmit the second pattern HS-sync during a period from the fourth time point t4c to a fifth time point t5c, and transmit the clock training pattern CLK-T during a period from the fifth time point t5c to a sixth time point t6c.

In addition, the transmitter TXD may transmit the start pattern STP during a period from the sixth time point t6c to a seventh time point t7c, transmit the first payload ePayload during a period from a seventh time point t7c to an eighth time point t8c, and transmit the end pattern EDP during a period from the eighth time point t8c to a ninth time point t9c.

Thereafter, the transmitter TXD may transmit the third pattern HS-trail during a period from a ninth time point t9c to a tenth time point t10c, and transmit the fourth pattern HS-exit after the tenth time point t10c.

The first pattern HS-zero may be a pattern for informing a waiting period after entering from the first mode mode1 to the second mode mode2. The second pattern HS-sync may be a pattern informing a transmission start of the first encoded data eData1.

The third pattern HS-trail may be a pattern informing a transmission end of the first encoded data eData1. The third pattern HS-trail may be a pattern in which a value opposite to last data of the first encoded data eData1 is repeated.

The fourth pattern HS-exit may be a pattern informing that the second mode mode2 is ended and the first mode mode1 is started. The pattern HS-exit may not be configured of a specific bit, but may be a transitional pattern in which a voltage is increased to exceed the second voltage range vr2.

The transmitter TXD may change the signals applied to the first line dp1 and the second line dn1 to the logic high level during a period from the tenth time point t10c to a twelfth time point t12c. In one embodiment, for example, an output of the pattern LP-11 may proceed from an eleventh time point t11c. Accordingly, the transmitter TXD may inform that the second mode mode2 is ended and the first mode mode1 is started.

In an embodiment, the receiver RXD may generate the clock signal RxByteClkHS of FIG. 7A or FIG. 7B (for example, a high speed transmission byte clock signal) using the clock training pattern CLK-T and the first payload ePayload. The first data receiver RX1 may include a clock data recovery circuit and may generate a clock signal having specific frequency and phase using the clock training pattern CLK-T.

In an embodiment, the first data receiver RX1 may continuously correct the phase of the clock signal to prevent skew of the clock signal using the first payload ePayload. The first data receiver RX1 may sample the received data using the generated clock signal.

Therefore, according to an embodiment, the transceiver device TSCV capable of communicating using the MIPI protocol without a clock line may be provided.

Figure 10:
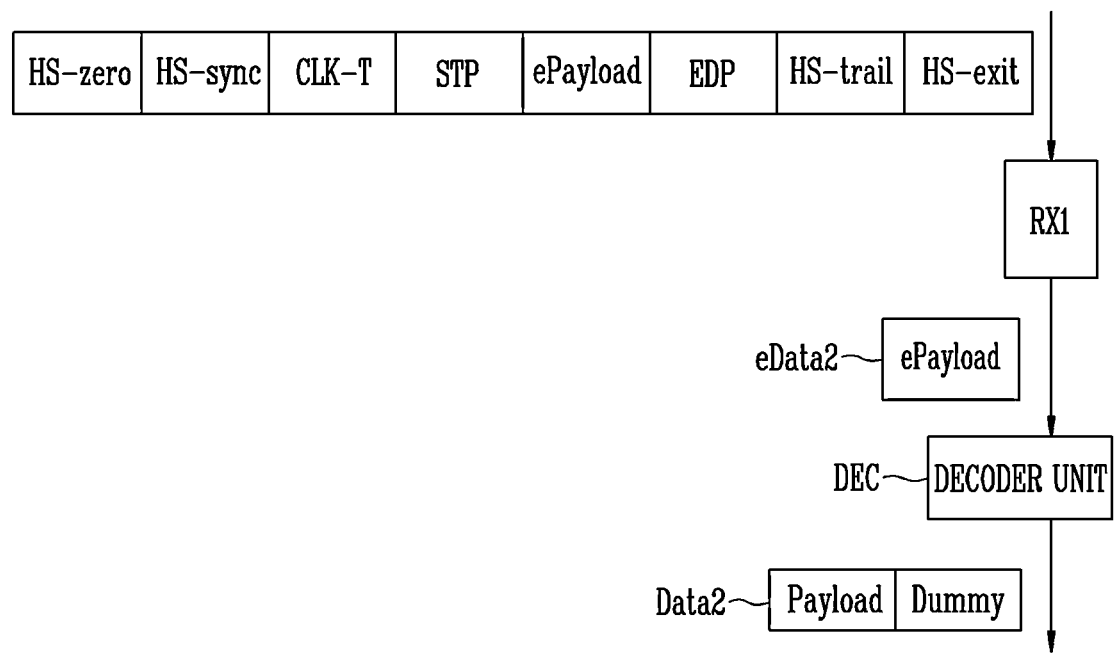
FIG. 10 is a diagram illustrating an embodiment of an operation of a receiver included in the transceiver device of FIGS. 6A and 6B.

FIG. 10 is a diagram illustrating an embodiment of the operation of the receiver included in the transceiver device of FIGS. 6A and 6B.

Referring to FIGS. 6, 7a, 7b, and 10, the first data receiver RX1 may provide the second encoded data eData2 including the first payload ePayload to the decoder unit DEC.

The decoder unit DEC may decode the second encoded data eData2 (that is, the first payload ePayload) to generate the second data Data2, and provide the generated second data Data2 to the reception controller RXC.

Since the second data Data2 may include a second payload Payload and a dummy pattern Dummy. The second payload Payload is the same as the original payload of the first data Data1 provided by the transmission controller TXC, the second data Data2 does not include separate phase information.

The dummy pattern Dummy may be encoded in advance to be embedded in the first payload ePayload by the encoder unit ENC, or may be added by the decoder unit DEC. The dummy pattern Dummy may be data in which the same value is repeated.

In one embodiment, for example, when the last value of the second payload Payload is 0, the dummy pattern Dummy may be data in which 1 is repeated, and when the last value of the second payload Payload is 1, the dummy pattern Dummy may be data in which 0 is repeated. Therefore, since a format (the payload and the dummy pattern Dummy) of the second data Data2 received by the reception controller RXC of FIG. 6A may be the same as a format (the payload and the additional information C) of the second data Data2 received by the reception controller RXCr of FIG. 2, an MIPI protocol interface may not be used to change the format thereof even though the clock line is removed from the transceiver device TSCV.

Similar to a case of the second data Data2 described with reference to FIG. 6, a format of the signals RxActiveHS, RxValidHS, RxSyncHS, and RxByteClkHS generated by the receiver RXD (for example, the first data receiver RX1) may be the same as a format of the signals RxActiveHS, RxValidHS, RxSyncHS, and RxByteClkHS generated by the receiver RXDr (for example, the first data receiver RX1r) described with reference to FIG. 3. Therefore, according to an embodiment, the MIPI protocol interface may not be used to change the format thereof even though the clock line is removed from the transceiver device TSCV.

Since the transmission of the second data Data2 and the level changes of the signals RxActiveHS, RxValidHS, RxSyncHS, and RxByteClkHS are described in detail with reference to FIG. 6, any repetitive detailed description thereof will be omitted The second data Data2 may include the additional information C and the second payload Payload configured of byte units B1, B2, B3, B4, B5, . . . , and Bn. Here, the additional information C may be information corresponding to the dummy pattern Dummy other than the pattern HS-trail. In one embodiment, for example, the additional information C may be 8 bit information in which 0 is repeated or 1 is repeated. In one embodiment, for example, the first data receiver RX1 may parallelize (for example, parallelize to 8 lines) the second payload Payload and the dummy pattern Dummy of the second data Data2 through a de-serializer, and transmit the parallelized second data Data2 to the reception controller RXC.

Figure 11:
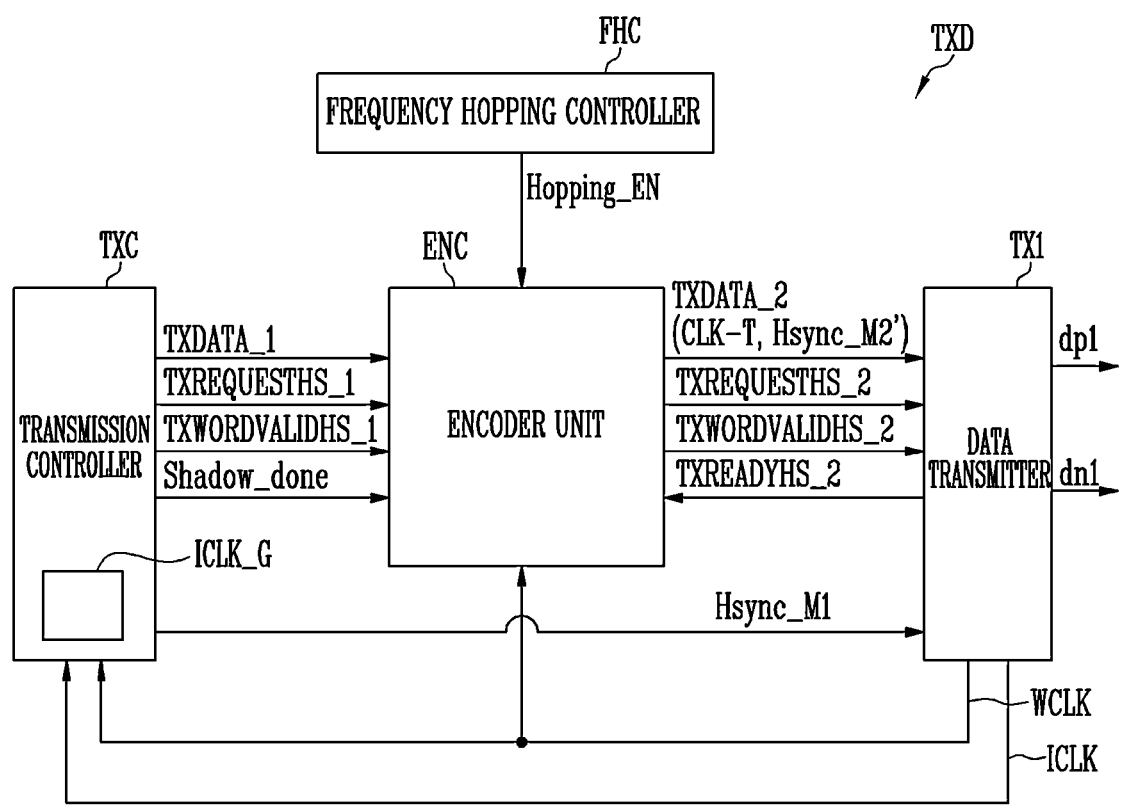
FIG. 11 is a block diagram illustrating an embodiment of the transmitter included in the transceiver device of FIGS. 7A and 7B.

FIG. 11 is a block diagram illustrating an embodiment of the transmitter included in the transceiver device of FIGS. 7A and 7B. FIG. 12 is a diagram illustrating the operation of the transmitter in the vertical blank period.

Referring to FIG. 11, an embodiment of the transmitter TXD may include the transmission controller TXC, the first data transmitter TX1 (hereinafter referred to as the data transmitter), the encoder unit ENC, and a frequency hopping controller FHC.

Hereinafter, an operation method of the transmitter TXD will be described with reference to the active period ACTP and the vertical blank period BP shown in FIG. 1B.

First, the operation of the transmitter TXD in the active period ACTP will be described with reference to FIGS. 7A to 11. The transmission controller TXC may transmit first transmission data TXDATA_1 including the original payload Payload to the encoder unit ENC based on a first internal clock signal WCLK. In one embodiment, for example, the transmission controller TXC may transmit the first transmission data TXDATA_1 including the original payload Payload to the encoder unit ENC in synchronization with a gate-on level of the first internal clock signal WCLK. In such an embodiment, the first transmission data TXDATA_1 may correspond to the first data Data1 of FIG. 7A.

The transmission controller TXC may provide a first transmission request signal TXREQUESTHS_1 and a first indication signal TXWORDVALIDHS_1 to the encoder unit ENC.

The first transmission request signal TXREQUESTHS_1 may mean a high speed transmission request. When the first transmission request signal TXREQUESTHS_1 is activated, data for switching from the first mode mode1 to the second mode mode2 may be output, and valid data including the original payload Payload may be provided from the transmission controller TXC to the encoder unit ENC.

The first indication signal TXWORDVALIDHS_1 may be a signal defined by the MIPI protocol, and may indicate that data to be transmitted to the encoder unit ENC is valid data.

The encoder unit ENC may transmit second transmission data TXDATA_2 to the data transmitter TX1. In one embodiment, for example, the encoder unit ENC may output the second transmission data TXDATA_2 based on the first internal clock signal WCLK.

The encoder unit ENC may encode at least a portion of the first transmission data TXDATA_1. In one embodiment, for example, the encoder unit ENC may encode the original payload Payload included in the first transmission data TXDATA_1 as the first payload ePayload.

The encoder unit ENC may perform data encoding according to a predetermined protocol. In an embodiment, the encoder unit ENC may perform data encoding so that data toggling occurs at least once per N bits of the first transmission data TXDATA_1 (N is an integer greater than 2). In one embodiment, for example, data may be toggled at least once every 6 bits by encoding of the encoder unit ENC.

In an embodiment, the encoder unit ENC may generate the second transmission data TXDATA_2 by adding data before and after (or prior to and subsequent to) the first payload ePayload. In such an embodiment, the second transmission data TXDATA_2 may correspond to the first encoded data eData1 of FIG. 7A.

In an embodiment, the encoder unit ENC may generate the clock training pattern CLK-T (or a third clock training pattern) in response to the first transmission request signal TXREQUESTHS_1, and transmit the clock training pattern CLK-T to the data transmitter TX1. In one embodiment, for example, the second transmission data TXDATA_2 may sequentially include the clock training pattern CLK-T (or the third clock training pattern), the start pattern STP, the first payload ePayload, and the end pattern EDP.

In an embodiment, the encoder unit ENC may provide a second transmission request signal TXREQUESTHS_2 and a second indication signal TXWORDVALIDHS_2 to the data transmitter TX1.

The second transmission request signal TXREQUESTHS_2 may mean a high speed transmission request. In an embodiment, the encoder unit ENC may activate the second transmission request signal TXREQUESTHS_2 in response to the first transmission request signal TXREQUESTHS_1. When the second transmission request signal TXREQUESTHS_2 is activated, the encoder unit ENC may transmit the clock training pattern CLK-T (or the third clock training pattern) to the data transmitter TX1.

The second indication signal TXWORDVALIDHS_2 may be a signal defined by the MIPI protocol, and may indicate that data to be transmitted to the data transmitter TX1 is valid data.

In an embodiment, the encoder unit ENC may transmit the second transmission data TXDATA_2 including the first payload ePayload to the data transmitter TX1 in synchronization with the gate-on level of the first internal clock signal WCLK provided from the data transmitter TX1.

The data transmitter TX1 may generate the first internal clock signal WCLK, and transmit the second transmission data TXDATA_2 including the clock training pattern CLK-T (or the third clock training pattern) and the first payload ePayload to the first line dp1 and the second line dn1. The first internal clock signal WCLK may be provided to the transmission controller TXC and the encoder unit ENC.

The data transmitter TX1 may transmit data for switching from the first mode mode1 to the second mode mode2 to the receiver RXD in response to the second transmission request signal TXREQUESTHS_2.

The data transmitter TX1 may provide a second transmission preparation signal TXREADYHS_2 to the encoder unit ENC. The second transmission preparation signal TXREADYHS_2 may indicate high speed transmission preparation. When the second transmission preparation signal TXREADYHS_2 is activated, the clock training pattern CLK-T (or the third clock training pattern) provided to the data transmitter TX1 may be transmitted to the receiver RXD.

Thereafter, the data transmitter TX1 may transmit the first payload ePayload provided from the encoder unit ENC to the receiver RXD.

Next, the operation of the transmitter TXD in the vertical blank period BP will be described with reference to FIGS. 7A to 12.

An embodiment of the display device 1000 shown in FIG. 1A may be a mobile terminal communicating with a base station. When the mobile terminal moves from a service space of a connected base station to a service space of another base station, a frequency band used between the base station and the mobile terminal may be changed in a process of the mobile terminal tuning to a call channel allocated to the service space of the other base station. In this case, an interference phenomenon with a frequency used between the transmitter TXD and the receiver RXD included in the mobile terminal may occur.

In an embodiment, the mobile terminal (or the transceiver device TSCV) may use a frequency hopping method to prevent such a frequency interference phenomenon. In such an embodiment, the frequency hopping method refers to a method of performing communication while changing the frequency (or a data transmission speed) used in data communication between the transmitter TXD and the receiver RXD in a wireless communication network according to a predetermined function.

The frequency hopping controller FHC may determine a possibility of occurrence of the frequency interference phenomenon between the base station and the mobile terminal (or the transceiver device TSCV). When it is determined that the frequency interference phenomenon occurs, the frequency hopping controller FHC may determine whether to include the frequency hopping period FHP in the vertical blank period BP. According to an embodiment, the frequency hopping controller FHC may provide a first register value Hopping_EN related to whether the frequency hopping period FHC is in an active state to the encoder unit ENC. In one embodiment, for example, the first register value Hopping_EN may be configured of 1 bit, and may include any one of a (1-1)th register value 1'b1 indicating that the frequency hopping period FHP is changed from the active state to an inactive state and a (1-2)th register value 1'b0 indicating that the frequency hopping period FHP is maintained as the active state or the inactive state. In such an embodiment, the (1-1)th register value 1'b1 may be a signal indicating that the frequency of the first internal clock signal WCLK is changed, and the (1-2)th register value 1'b0 may be a signal indicating that the frequency of the first internal clock signal WCLK is maintained without being changed.

The data transmitter TX1 may change a frequency setting value of the first internal clock signal WCLK in the vertical blank section BP to change the data transmission speed in a predetermined range (for example: ±2.5%) compared to a preset reference data transmission speed (for example: 67 Gbps). When the frequency setting value of the first internal clock signal WCLK is changed, the data transmitter TX1 may transmit data based on the changed first internal clock signal WCLK.

The data transmitter TX1 may not transmit the first internal clock signal WCLK to the transmission controller TXC and the encoder unit ENC while changing the frequency setting value of the first internal clock signal WCLK. In one embodiment, for example, the first internal clock signal WCLK may be maintained as a predetermined level (for example, a low level, refer to FIG. 12) in the frequency hopping period FHP. In such an embodiment, the data transmitter TX1 may not generate the first internal clock WCLK in the frequency hopping period FHP.

According to an embodiment, the data transmitter TX1 may generate a second internal clock signal ICLK. The data transmitter TX1 may provide the second internal clock signal ICLK to the transmission controller TXC. According to an alternative embodiment, the transmission controller TXC may further include a second internal clock signal generator ICLK_G that generates the second internal clock signal ICLK by itself.

In such an embodiment, the second internal clock signal ICLK may not be provided to the encoder unit ENC. Therefore, the data transmitter TX1 may operate based on the second internal clock signal ICLK in the frequency hopping period FHP, and may operate based on the first internal clock signal WCLK in the periods BP1 and BP2 except for the frequency hopping period. In such an embodiment, the encoder unit ENC operating only based on the first internal clock signal WCLK may not operate or may hold a previous operation in the frequency hopping period FHP.

In an embodiment, as shown in FIG. 1B, the horizontal synchronization signal Hsync may include pulses having a predetermined interval (for example, one horizontal period 1H) also in the vertical blank period BP. Therefore, in the vertical blank period BP, in the periods BP1 and BP2 except for the frequency hopping period, the transmission controller TXC may generate the horizontal synchronization signal Hsync_M2 in the second mode mode2 of FIG. 9, and transmit the horizontal synchronization signal Hsync_M2 to the encoder unit ENC, and the encoder unit ENC may encodes the horizontal synchronization signal Hsync_M2 to generate the horizontal synchronization data Hsync_M2', and generate the first encoded data eData1 by adding the predetermined clock training pattern CLK-T in the horizontal synchronization data Hsync_M2'. In such an embodiment, in the frequency hopping period FHP, the transmission controller TXC may generate the horizontal synchronization signal Hsync_M1 in the first mode mode1.

In an embodiment, as shown in FIG. 12, during the vertical blank period BP, the period BP1 before the frequency hopping, the transmission controller TXC may generate the horizontal synchronization signal Hsync_M2 in the second mode mode2 based on the first internal clock signal WCLK, and provide the horizontal synchronization signal Hsync_M2 to the encoder unit ENC. Thereafter, the encoder unit ENC may encode the horizontal synchronization signal Hsync_M2 to generate the first payload ePayload (or the horizontal synchronization data Hsync_M2'), and generate the first encoded data eData1 by adding predetermined data before and after (or prior to and subsequent to) the first payload ePayload (or the horizontal synchronization data Hsync_M2'). In one embodiment, for example, the first encoded data eData1 may sequentially include the clock training pattern CLK-T, the start pattern STP, the first payload ePayload (or the horizontal sync data Hsync_M2'), and the end pattern EDP. In such an embodiment, the encoder unit ENC may output the first encoded data eData1 at a rising edge of the first internal clock signal WCLK.

During the vertical blank period BP, in the frequency hopping period FHP, the transmission controller TXC may generate the horizontal synchronization signal Hsync_M1 in the first mode mode1 of FIG. 9 based on the second internal clock signal ICLK, and transmit the horizontal synchronization signal Hsync_M1 to the data transmitter TX1. In one embodiment, for example, the transmission controller TXC may output the horizontal synchronization signal Hsync_M2 at a rising edge of the second internal clock signal ICLK. In such an embodiment, a period of the second internal clock signal ICLK may maintain a constant second period FR2 regardless of frequency hopping.

Since the encoder unit ENC does not operate in the frequency hopping period FHP, the horizontal synchronization signal Hsync_M1 may be directly transmitted from the transmission controller TXC to the data transmitter TX1. In such an embodiment, an amplitude H1 of the horizontal synchronization signal Hsync_M1 generated in the first mode mode1 of FIG. 9 may be greater than an amplitude H2 of the horizontal synchronization signal Hsync_M2 (or the horizontal synchronization data Hsync_M2') generated in the second mode mode2 of FIG. 9.

During the vertical blank period BP, also in the period BP2 after the frequency hopping, the transmission controller TXC may generate the horizontal synchronization signal Hsync_M2 in the second mode mode2 of FIG. 8 based on the first internal clock signal WCLK. However, in the period BP2 after the frequency hopping, the encoder unit ENC may generate the first encoded data eData1 by including a second clock training pattern CLK-T2 instead of a first clock training pattern CLK-T1. In such an embodiment, a length L2 of the second clock training pattern CLK-T2 may be longer than a length L1 of the first clock training pattern CLK-T1. The frequency of the first internal clock signal WCLK may be changed after the frequency hopping period FHP. In one embodiment, for example, the period of the first internal clock signal WCLK may have a first period FR1 before the frequency hopping period FHP and may have a first' period FR1' after the frequency hopping period FHP. The first' period FR1' may be shorter than the first period FR. For convenience of illustration, a length of a pattern including the start pattern STP, the first payload (ePayload) (or the horizontal synchronization data Hsync_M2'), and the end pattern EDP is shown in FIG. 12 as being substantially the same as each other before and after (or prior to and subsequent to) the frequency hopping period FHP, but since the first internal clock signal WCLK transmits 16 bits per one clock, the length of the pattern including the start pattern STP, the first payload (ePayload) (or the horizontal synchronization data Hsync_M2'), and the end pattern EDP after the frequency hopping period FHP may be shorter than the length of the pattern including the start pattern STP, the first payload (ePayload) (or the horizontal synchronization data Hsync_M2'), and the end pattern EDP before the frequency hopping period FHP.

Since the encoder unit ENC operates based on the changed first internal clock signal WCLK, the receiver RXD (or the clock data recovery circuit) may use more (or longer) time for tracking the changed frequency information and phase information. In one embodiment, for example, a time for the receiver RXD (or the clock data recovery circuit) to track second frequency information and/or second phase information of the second clock training pattern CLK_T2, that is, a locking time may be longer than a time for tracking first frequency information and first phase information of the first clock training pattern CLK_T1, that is, a locking time.

According to an embodiment, the transmission controller TXC may provide an end flag signal Shadow_done to the encoder unit ENC as information on whether the frequency hopping period FHP is in the active state, based on the first internal clock signal WCLK. In one embodiment, for example, when the end flag signal Shadow_done has a logic high level, it may be determined that the frequency hopping period FHP is changed from the active state to the inactive state.

In an embodiment, as described above, the frequency hopping controller FHC may provide the first register value Hopping_EN related to whether the frequency hopping period FHP is in the active state to the encoder unit ENC. In one embodiment, for example, the first register value Hopping_EN may be configured of 1 bit, and may include any one of the (1-1)th register value 1'b1 indicating that the frequency hopping period FHP is changed from the active state to the inactive state and the (1-2)th register value 1'b0 indicating that the frequency hopping period FHP is maintained as the active state or the inactive state. In an embodiment, the (1-1)th register value 1'b1 may be a signal indicating that the frequency of the first internal clock signal WCLK is changed, and the (1-2)th register value 1'b0 may be a signal indicating that the frequency of the first internal clock signal WCLK is maintained without change. The encoder unit ENC may receive the end flag signal Shadow_done (for example, a logic high level signal) from the transmission controller TXC, and when the (1-1)th register value (for example, 1'b1) is received from the frequency hopping controller FHC, in the second mode mode2 of FIG. 9, the encoder unit ENC may generate the first encoded data eData1 by adding the second clock training pattern CLK-T2 to the first payload ePayload (or the horizontal synchronization data Hsync_M2'). In such an embodiment, a length of the second clock training pattern CLK-T2 may be longer than the length of the first clock training pattern CLK-T1 by a preset length. In one embodiment, for example, when the data transmission speed of the transceiver device TSCV changes within ±2.5% during frequency hopping, the preset length may be set to correspond to an intermediate value (that is, ±1.25%).

According to an embodiment, a length of the second clock training pattern CLK-T2 may be increased by further including a pattern in which one 1 and one 0 are repeated alternately with each other in the first clock training pattern CLK-T1 (that is, increase the number of toggling of 0 and 1). However, the disclosure is not limited thereto, and in one alternative embodiment, for example, the length of the second clock training pattern CLK-T2 may be increased by further including a pattern in which a plurality of successive 1s and a plurality of successive 0s are repeated alternately with each other in the first clock training pattern CLK-T1.

The transmitter TXDr shown in FIGS. 2 and 3 includes the clock transmitter TCr separately from the data transmitters TX1r, TX2r, TX3r, and TX4r. Therefore, even though the data transmission speed between the transmitter TXDr and the receiver RXDr changes as the frequency hopping occurs, since the transmitter TXDr operates based on the changed clock signal, synchronization of horizontal synchronization signals Hsync and Hsync' may be effectively performed.

However, in an embodiment of the transmitter TXD using the clock embedded method shown in FIGS. 7A and 7B, when the data transmission speed between the transmitter TXDr and the receiver RXDr is changed as frequency hopping occurs, the receiver RXD (or the clock data recovery circuit) may use more time for tracking the changed frequency information and phase information. According to an embodiment of the disclosure, the transceiver device TSCV may synchronize the horizontal synchronization signal provided from the transmitter TXD and the horizontal synchronization signal recovered by the receiver RXD even though the vertical blank period BP includes the frequency hopping period FHP, by adding the second clock training pattern CLK-T2 longer than the length of the first clock training pattern CLK-T1 in the first payload ePayload (or the horizontal synchronization data Hsync_M2') after the frequency hopping period FHP is ended. In such an embodiment, even though the transceiver device TSCV does not include the clock transmitter TCr separately from the data transmitters TX1r, TX2r, TX3r, and TX4r in the transmitter TXDr differently from that shown in FIGS. 2 and 3, the frequency hopping method may be effectively performed.

Hereinafter, an alternative embodiment will be described. In such an embodiment, any repetitive detailed description of the same or like configurations as those of the embodiments described above will be omitted or simplified, and differences will be mainly described.

Figure 13:
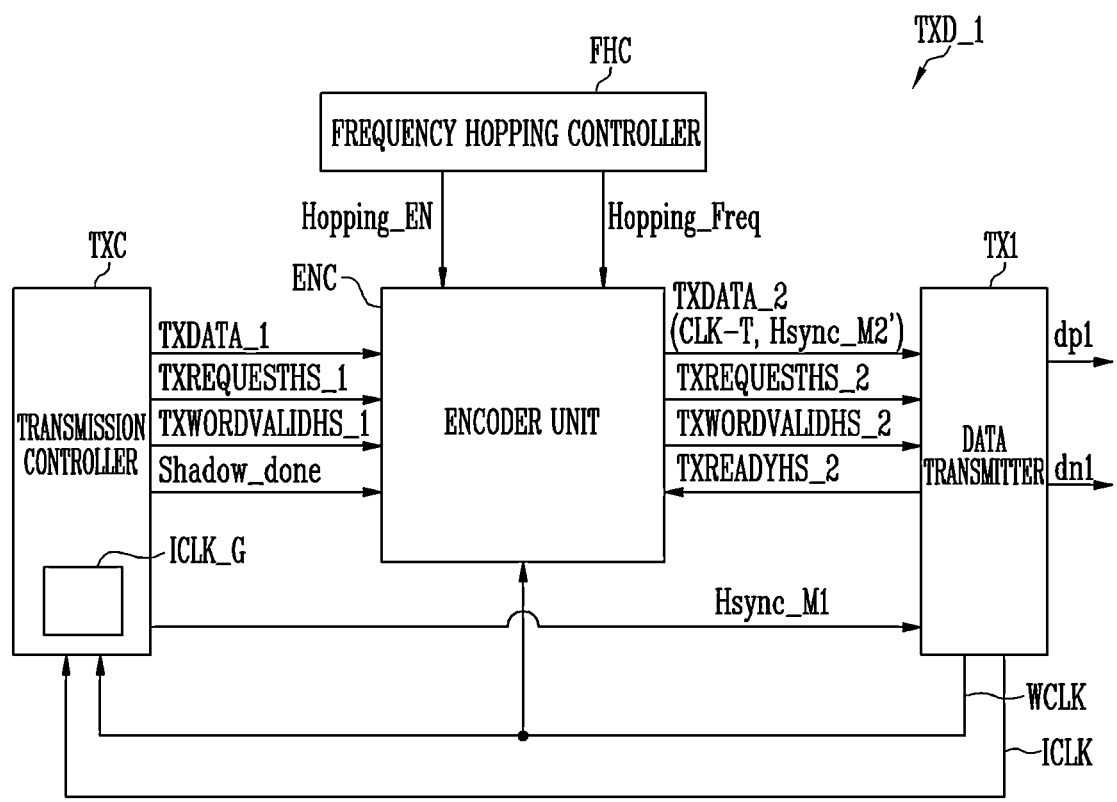
FIG. 13 is a block diagram illustrating another embodiment of the transmitter included in the transceiver device of FIGS. 7A and 7B.
Figure 14:
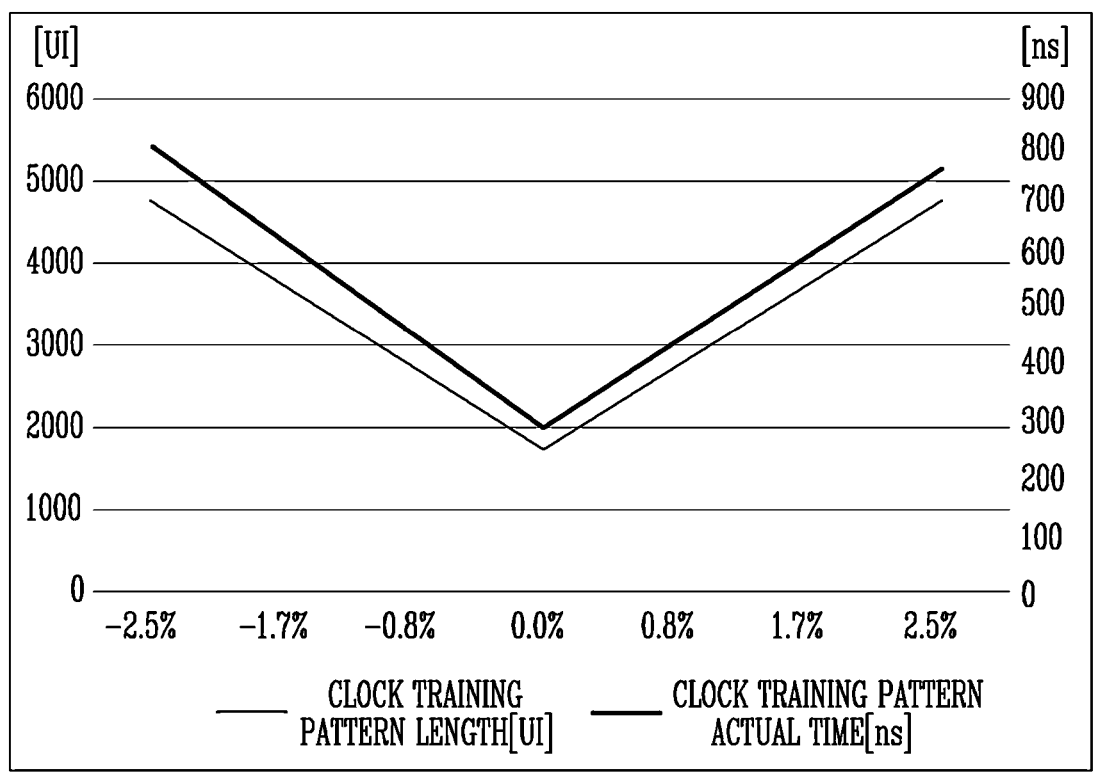
FIG. 14 is a graph illustrating an embodiment in which a length of a second clock training pattern varies in response to a data transmission speed change range of the transceiver device.

FIG. 13 is a block diagram illustrating another example of the transmitter included in the transceiver device of FIGS. 7A and 7B. FIG. 14 is a graph illustrating an embodiment in which the length of the second clock training pattern varies in response to a data transmission speed change range of the transceiver device. FIG. 15 is a diagram illustrating the operation of the transmitter that varies the length of the second clock training pattern in response to the data transmission speed change range of the transceiver device.

The frequency hopping controller FHC of a transmitter TXD_1 shown in FIG. 13 is different from the frequency hopping controller FHC of the transceiver device TSCV shown in FIG. 11, which receives only the first register value Hopping_EN related to whether the frequency hopping period FHP is in the active state, in that the frequency hopping controller FHC of the transmitter TXD_1 shown in FIG. 13 further provides a plurality of second register values Hopping_Freq corresponding to the change range of the data transmission speed of the transceiver device. Since the operation of the transceiver device TSCV in the active period ACTP is substantially the same as that of the embodiment shown in FIG. 11, any repetitive detailed description thereof will be omitted, and the operation of the transceiver device TSCV in the vertical blank period BP is mainly described.

Referring to FIGS. 7A to 13, an embodiment of the transmitter TXD_1 may include the transmission controller TXC, the data transmitter TX1, the encoder unit ENC, and the frequency hopping controller FHC.

In an embodiment, as described above with reference to FIG. 12, during the vertical blank period BP, the period BP1 before the frequency hopping, the transmission controller TXC may generate the horizontal synchronization signal Hsync_M2 in the second mode mode2 of FIG. 8 based on the first internal clock signal WCLK, and provide the horizontal synchronization signal Hsync_M2 to the encoder unit ENC. Thereafter, the encoder unit ENC may encode the horizontal synchronization signal Hsync_M2 to generate the first payload ePayload (or the horizontal synchronization data Hsync_M2'), and generate the first encoded data eData1 by adding predetermined data before and after (or prior to and subsequent to) the first payload ePayload (or the horizontal synchronization data Hsync_M2').

During the vertical blank period BP, in the frequency hopping period FHP, the transmission controller TXC may generate the horizontal synchronization signal Hsync_M1 in the first mode mode1 of FIG. 9 based on the second internal clock signal ICLK, and transmit the horizontal synchronization signal Hsync_M1 to the data transmitter TX1. In such an embodiment, since the encoder unit ENC does not operate in the frequency hopping period FHP, the horizontal synchronization signal Hsync_M1 may be directly transmitted from the transmission controller TXC to the data transmitter TX1. In such an embodiment, the amplitude H1 of the horizontal synchronization signal Hsync_M1 generated in the first mode mode1 of FIG. 9 may be greater than the amplitude H2 of the horizontal synchronization signal Hsync_M2 (or the horizontal synchronization data Hsync_M2') generated in the second mode mode2 of FIG. 9.

During the vertical blank period BP, also in the period BP2 after the frequency hopping, the transmission controller TXC may generate the first payload ePayload (or the horizontal synchronization data Hsync_M2') in the second mode mode2 of FIG. 8 based on the first internal clock signal WCLK, and generate the first encoded data eData1 by adding predetermined data (for example, CLK-T, STP, and EDP) before and after (or prior to and subsequent to) the first payload ePayload (or the horizontal synchronization data Hsync_M2'). However, in the period BP2 after the frequency hopping, the encoder unit ENC may generate the first encoded data eData1 by adding the second clock training pattern CLK-T2 instead of the first clock training pattern CLK-T1. In such an embodiment, the length L2 of the second clock training pattern CLK-T2 may be longer than the length L1 of the first clock training pattern CLK-T1.

The frequency of the first internal clock signal WCLK may be changed after the frequency hopping period FHP. In one embodiment, for example, the period of the first internal clock signal WCLK may have the first period FR1 before the frequency hopping period FHP and may have the first' period FR1' after the frequency hopping period FHP. The first' period FR1' may be shorter than the first period FR. For convenience of illustration and description, the length of the pattern including the start pattern STP, the first payload (ePayload) (or the horizontal synchronization data Hsync_M2'), and the end pattern EDP is shown in FIG. 12 as being the same before and after (or prior to and subsequent to) the frequency hopping period FHP, but since the first internal clock signal WCLK transmits 16 bits per one clock, the length of the pattern including the start pattern STP, the first payload (ePayload) (or the horizontal synchronization data Hsync_M2'), and the end pattern EDP after the frequency hopping period FHP may be shorter than the length of the pattern including the start pattern STP, the first payload (ePayload) (or the horizontal synchronization data Hsync_M2'), and the end pattern EDP before the frequency hopping period FHP.

Since the encoder unit ENC operates based on the changed first internal clock signal WCLK, the receiver RXD (or the clock data recovery circuit) may use more time for tracking the changed frequency information and phase information. In one embodiment, for example, the time for tracking the second frequency information and/or the second phase information of the second clock training pattern CLK_T2, that is, the locking time, may be longer than the time for tracking the first frequency information and the first phase information of the first clock training pattern CLK_T1, that is, the locking time.

At this time, the time for the receiver RXD (or the clock data recovery circuit) to track the second frequency information and/or the second phase information of the second clock training pattern CLK_T2, that is, the locking time may vary in response to the data transmission speed change range. In one embodiment, for example, as the data transmission speed change range increases, the time for tracking the second frequency information and/or the second phase information of the second clock training pattern CLK_T2, that is, the locking time may be longer.

According to an embodiment, the transmission controller TXC may provide the end flag signal Shadow_done to the encoder unit ENC as the information on whether the frequency hopping period FHP is in the active state, based on the first internal clock signal WCLK. In one embodiment, for example, when the end flag signal Shadow_done has a logic high level, it may be determined that the frequency hopping period FHP is changed from the active state to the inactive state.

In such an embodiment, the frequency hopping controller FHC may provide the first register value Hopping_EN related to whether the frequency hopping period FHP is in the active state to the encoder unit ENC. In one embodiment, for example, the first register value Hopping_EN may be configured of 1 bit, and may include any one of the (1-1)th register value 1'b1 indicating that the frequency hopping period FHP is changed from the active state to the inactive state and the (1-2)th register value 1'b0 indicating that the frequency hopping period FHP is maintained as the active state or the inactive state. In such an embodiment, the (1-1)th register value 1'b1 may be a signal indicating that the frequency of the first internal clock signal WCLK is changed, and the (1-2)th register value 1'b0 may be a signal indicating that the frequency of the first internal clock signal WCLK is maintained without change.

In such an embodiment, when it is determined that the frequency interference phenomenon occurs, the frequency hopping controller FHC may additionally provide a second register value Hopping_Freq including information on the change range of the data transmission speed of the transceiver device TSCV to the encoder unit ENC.

According to an embodiment, the second register value Hopping_Freq may be configured of register values corresponding to each preset interval by dividing the change range of the data transmission speed of the data transmitter TX1 in the preset interval.

In one embodiment, for example, the second register values Hopping_Freq may be configured of 5 bits, and may include 25 register values generated by dividing the change range of the data transmission speed (for example: ±2.5%) in an interval of ±0.1%. However, the number of register values included in the second register value Hopping_Freq is not limited thereto. In one embodiment, for example, according to a locking time resolution design of the receiver RXD (or the clock data recovery circuit), when the change range of the data transmission speed (or a degree of the frequency hopping) is divided in a greater interval, the number of register values included in the second register value Hopping_Freq may be decreased, and when the change range of the data transmission speed is divided in a less interval, the number of register values included in the second register value Hopping_Freq may be increased.

Table 1 below shows an embodiment of the data transmission speed of the data transmitter TX1, the length of the second clock training pattern CLK-T2, an actual length of the second clock training pattern CLK-T2, a frequency change degree of the first internal clock signal WCLK, in response to a degree of the frequency hopping. At this time, a unit interval (UI) means 1 bit. "1 UI" of Table 1 is defined as a reciprocal number of the data transmission speed.

In one embodiment, for example, the frequency hopping does not exist (that is, the data transmission speed change range is 0%), the transmission speed of the data transmitter TX1 may be 6 Gbps, and the second clock training pattern CLK-T2 may have 1800 UI. Since 1 UI at this time is 0.167 nanoseconds (ns), the actual length (or time) of the second clock training pattern CLK-T2 may be 1800×0.167=300 ns. In addition, since the first internal clock signal WCLK transmits 16 bits per one clock, the frequency of the first internal clock signal WCLK may be 6 G/16=375 megahertz (MHz).

In such an embodiment, when the data transmission speed change range is increased by 0.8%, the transmission speed of the data transmitter TX1 may be 6.05 Gbps, and the second clock training pattern CLK-T2 may have 2760 UI. Since 1 UI at this time is 0.165 ns, the actual length (or time) of the second clock training pattern CLK-T2 may be 2760× 0.165=456 ns. In addition, since the first internal clock signal WCLK transmits 16 bits per one clock, the frequency of the first internal clock signal WCLK may be 6.05 G/16=378 MHz.

In such an embodiment, when the data transmission speed change range is increased by 1.7%, the transmission speed of the data transmitter TX1 may be 6.1 Gbps, and the second clock training pattern CLK-T2 may have 3840 UI. Since 1 UI at this time is 0.164 ns, the actual length (or time) of the second clock training pattern CLK-T2 may be 3840× 0.164=630 ns. In such an embodiment, since the first internal clock signal WCLK transmits 16 bits per one clock, the frequency of the first internal clock signal WCLK may be 6.1 G/16=381 MHz.

In such an embodiment, when the data transmission speed change range is increased by 2.5%, the transmission speed of the data transmitter TX1 may be 6.15 Gbps, and the second clock training pattern CLK-T2 may have 4800 UI. Since 1 UI at this time is 0.163 ns, the actual length (or time) of the second clock training pattern CLK-T2 may be 4800× 0.163=780 ns. In such an embodiment, since the first internal clock signal WCLK transmits 16 bits per one clock, the frequency of the first internal clock signal WCLK may be 6.15 G/16=384 MHz.

In such an embodiment as the data transmission speed change range increases in an order of 0.8%, 1.7%, and 2.5%, the length (or time) of the second clock training pattern CLK-T2 may be increased to 456 ns, 630 ns, and 780 ns, and the frequency of the first internal clock signal WCLK may also be increased to 378 MHz, 381 [Hz, and 384 MHz.

In such an embodiment, when the data transmission speed change range is decreased by 0.8%, the transmission speed of the data transmitter TX1 may be 5.95 Gbps, and the second clock training pattern CLK-T2 may have 2760 UI. Since 1 UI at this time is 0.168 ns, the actual length (or time) of the second clock training pattern CLK-T2 may be 2760× 0.168=464 ns. In such an embodiment, since the first internal clock signal WCLK transmits 16 bits per one clock, the frequency of the first internal clock signal WCLK may be 5.95 G/16=372 MHz.

In such an embodiment, when the data transmission speed change range is decreased by 1.7%, the transmission speed of the data transmitter TX1 may be 5.9 Gbps, and the second clock training pattern CLK-T2 may have 3840 UI] Since 1 UI at this time is 0.169 ns, the actual length (or time) of the second clock training pattern CLK-T2 may be 3840× 0.169=651 ns. In addition, since the first internal clock signal WCLK transmits 16 bits per one clock, the frequency of the first internal clock signal WCLK may be 5.9 G/16=369 MHz.

In such an embodiment, when the data transmission speed change range is decreased by 2.5%, the transmission speed of the data transmitter TX1 may be 5.85 Gbps, and the second clock training pattern CLK-T2 may have 4800 UI. Since 1 UI at this time is 0.171 ns, the actual length (or time) of the second clock training pattern CLK-T2 may be 4800× 0.171=821 ns. In such an embodiment, since the first internal clock signal WCLK transmits 16 bits per one clock, the frequency of the first internal clock signal WCLK may be 5.85 G/16=366 MHz.

In such an embodiment, as the data transmission speed change range decreases in an order of 0.8%, 1.7%, and 2.5%, the length (or time) of the second clock training pattern CLK-T2 may be increased to 464 ns, 651 ns, and 821 ns, and the frequency of the first internal clock signal WCLK may be decreased to 372 MHz, 369 MHz, and 366 MHz.

TABLE 1

| Change degree [%] | Data transmission speed [Gbps] | 1UI[ns] | Clock training pattern length [UI] | Clock training pattern actual length [ns] | WCLK [MHz] |
|---|---|---|---|---|---|
| −2.5% | 5.85 | 0.171 | 4800 | 821 | 366 |
| −1.7% | 5.9 | 0.169 | 3840 | 651 | 369 |
| −0.8% | 5.95 | 0.168 | 2760 | 464 | 372 |
| 0.0% | 6 | 0.167 | 1800 | 300 | 375 |
| 0.8% | 6.05 | 0.165 | 2760 | 456 | 378 |
| 1.7% | 6.1 | 0.164 | 3840 | 630 | 381 |
| 2.5% | 6.15 | 0.163 | 4800 | 780 | 384 |

Referring to FIG. 14, the length of the second clock training pattern CLK-T2 may increase as the data transmission speed change range increases to ±0.8%, ±1.7%, and ±2.5%. In an embodiment, when the frequency hopping does not exist, the length of the second clock training pattern CLK-T2 may be preset to 1800 UI, when the data transmission speed is changed up to ±2.5% due to the frequency hopping, the length of the second clock training pattern CLK-T2 may be preset to 4800 UI, and the length of the second clock training pattern CLK-T2 may be applied proportionally to the other change range of the data transmission speed based on the length of the second clock training patterns and the data transmission speed change ranges described above.

Referring to FIGS. 13 to 15, when the encoder unit ENC receives the end flag signal Shadow_done from the transmission controller TXC, and receives the (1-1)th register value Hopping_EN from the frequency hopping controller FHC, the encoder unit ENC may encode the horizontal synchronization signal Hsync_M2 received from the transmission controller TXC to generate the first payload ePayload (or the horizontal synchronization data Hsync_M2'), and may generate the first encoded data eData1 by adding predetermined data before and after (or prior to and subsequent to) the first payload ePayload (or the horizontal synchronization data Hsync_M2'). In an embodiment, the encoder unit ENC may generate the first encoded data eData1 of FIG. 8 by including the second clock training pattern CLK-T2 instead of the first clock training pattern CLK-T1 in the first payload ePayload (or the horizontal synchronization data Hsync_M2').

In an embodiment, the encoder unit ENC may additionally receive the second register value Hopping_Freq from the frequency hopping controller FHC. According to an embodiment, the second register value Hopping_Freq may include a (2-1)th register value corresponding to a first data transmission speed change range (for example: ±0.8%), a (2-2)th register value corresponding to a second data transmission speed change range (for example: ±1.7%), and a (2-3)th register value corresponding to a third data transmission speed change range (for example: ±2.5%). The frequency hopping controller FHC may provide any one of the (2-1)th register value, the (2-2)th register value, and the (2-3)th register value to the encoder unit ENC based on the change range of the data transmission speed. However, the number of register values included in the second register value Hopping_Freq is exemplary and may vary. Here, 5b'00000 may be a register value when the data transmission speed is not changed, and 5b'xxxxx may be a register value corresponding to any one of the (2-1)th register value, the (2-2)th register value, and the (2-3)th register value.

The encoder unit ENC may determine the length of the second clock training pattern CLK-T2 in response to the received second register value Hopping_Freq. In one embodiment, for example, as shown in FIG. 15, when the encoder unit ENC receives the (2-1)th register value, the encoder unit ENC may generate the first encoded data eData1 by including a twenty-first clock training pattern CLK-T21 in the horizontal synchronization data Hsync_M2' in the second mode mode2, when the encoder unit ENC receives the (2-2)th register value, the encoder unit ENC may generate the first encoded data eData1 by including a twenty-second clock training pattern CLK-T22 in the horizontal synchronization data Hsync_M2' in the second mode mode2, and when the encoder unit ENC receives the (2-3)th register value, the encoder unit ENC may generate the first encoded data eData1 by including a twenty-third clock training pattern CLK-T23 in the horizontal synchronization data Hsync_M2' in the second mode mode2. In such an embodiment, a length may be longer in an order of the twenty-first clock training pattern CLK-T21, the twenty-second clock training pattern CLK-T22, and the twenty-third clock training pattern CLK-T23. For convenience of illustration and description, it is illustrated that only the second clock training pattern CLK-T2 is added to the horizontal synchronization data Hsync_M2' in FIG. 15, but as shown in FIG. 12, the start pattern STP and the end pattern EDP may be included before and after (or prior to and subsequent to) the horizontal synchronization data Hsync_M2'.

The length of the second clock training pattern CLK-T2 may be longer than the length of the first clock training pattern CLK-T1. According to an embodiment, the length of the second clock training pattern CLK-T2 may be increased by further including a pattern in which one 1 and one 0 are repeated in the first clock training pattern CLK-T1 (that is, increase the number of toggling of 0 and 1). In one embodiment, for example, the (2-1)th register value, the (2-2)th register value, and the (2-3)th register value may correspond to 2760 UI, 3840 UI, and 4800 UI, respectively. Therefore, the length of the second clock training pattern CLK-T2 (that is, the twenty-second clock training pattern CLK-T22) increases by 1080 UI (or increases the number of toggling of 0 and 1 by 540) in the second data transmission speed change range (for example: ±1.7%) compared to the first data transmission speed change range (for example: ±0.8%), and the length of the second clock training pattern CLK-T2 (that is, the twenty-third clock training pattern CLK-T23) increases by 960 UI (or increases the number of toggling of 0 and 1 by 480) in the third data transmission speed change range (for example: ±2.5%) compared to the second data transmission speed change range (for example: ±1.7%).

Therefore, since the length of the second clock training pattern CLK-T2 may more accurately vary in response to a frequency hopping change degree, the time for tracking the second frequency information and/or the second phase information of the second clock training pattern CLK_T2 of the receiver RXD, that is, the locking time may be optimized.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A transceiver device comprising:
a transmitter and a receiver connected to each other through a first line and a second line,
wherein a first frame period includes an active period in which a first payload is transmitted from the transmitter to the receiver and a vertical blank period including a frequency hopping period in which a data transmission speed between the transmitter and the receiver is variable,
wherein the transmitter transmits signals having a first voltage range to the first line and the second line in a first mode, and transmits signals having a second voltage range less than the first voltage range to the first line and the second line in a second mode,
wherein the transmitter generates a first horizontal synchronization signal in the second mode in a period except for the frequency hopping period of the vertical blank period, encodes the first horizontal synchronization signal to horizontal synchronization data, and generates a second horizontal synchronization signal in the first mode in the frequency hopping period, and
wherein the transmitter adds a first clock training pattern to the horizontal synchronization data in the period except for the frequency hopping period of the vertical blank period, and adds a second clock training pattern different from the first clock training pattern to the horizontal synchronization data after the frequency hopping period is ended.

2. The transceiver device according to claim 1, wherein a length of the second clock training pattern is longer than a length of the first clock training pattern.

3. The transceiver device according to claim 1, wherein a length of the second clock training pattern is variable based on a change range of the data transmission speed.

4. The transceiver device according to claim 3, wherein the length of the second clock training pattern increases as the change range of the data transmission speed increases.

5. The transceiver device according to claim 1, wherein the transmitter generates the first payload by encoding an original payload in the second mode during the active period, and transmits a third clock training pattern and the first payload through the first line and the second line.

6. The transceiver device according to claim 1, wherein the transmitter comprises:
- a data transmitter which generates a first internal clock signal and a second internal clock signal, and transmits first encoded data, to which the first clock training pattern or the second clock training pattern is added, to the first line and the second line during the vertical blank period;
- a transmission controller which receives the first and second internal clock signals, generates the first horizontal synchronization signal in the second mode based on the first internal clock signal, and generates the second horizontal synchronization signal in the first mode based on the second internal clock signal; and
- an encoder unit which receives only the first internal clock signal of the first and second internal clock signals, generates the horizontal synchronization data by encoding the first horizontal synchronization signal received from the transmission controller based on the first internal clock signal, and generates the first encoded data by adding the first clock training pattern or the second clock training pattern to the horizontal synchronization data.

7. The transceiver device according to claim 6, wherein the data transmitter generates only the second internal clock signal without generating the first internal clock signal during the frequency hopping period.

8. The transceiver device according to claim 6, wherein the transmission controller transmits an original payload to the encoder unit based on the first internal clock signal.

9. The transceiver device according to claim 6, wherein the encoder unit encodes an original payload provided from the transmission controller to the first payload including an encoding key.

10. The transceiver device according to claim 6, wherein the transmitter further comprises a frequency hopping controller which provides a first register value related to whether the frequency hopping period is in an active state to the encoder unit, and
the first register value includes a (1-1)th register value indicating that the frequency hopping period is changed from the active state to an inactive state and a (1-2)th register value indicating that the frequency hopping period is maintained as the active state or the inactive state.

11. The transceiver device according to claim 10, wherein the transmission controller provides the encoder unit with an end flag signal indicating that the frequency hopping period is ended, based on the first internal clock signal.

12. The transceiver device according to claim 11, wherein the encoder unit adds the second clock training pattern to the horizontal synchronization data based on the (1-1)th register value and the end flag signal.

13. The transceiver device according to claim 10, wherein the frequency hopping controller provides a second register value including change range information of the data transmission speed to the encoder unit.

14. The transceiver device according to claim 13, wherein the second register value includes a (2-1)th register value corresponding to first data transmission speed change range, a (2-2)th register value corresponding to second data transmission speed change range, and a (2-3)th register value corresponding to third data transmission speed change range, and
the data transmission speed change range increases in an order of the first data transmission speed change range, the second data transmission speed change range, and the third data transmission speed change range.

15. The transceiver device according to claim 14, wherein the encoder unit increases a length of the second clock training pattern in an order of the (2-1)th register value, the (2-2)th register value, and the (2-3)th register value.

16. The transceiver device according to claim 1, wherein the first line and the second line are used in a single-ended method in the first mode, and
the first line and the second line are used in a differential method in the second mode.

17. A method of driving a transceiver device including a transmitter and a receiver connected to each other through a first line and a second line,
wherein a first frame period includes an active period in which a first payload is transmitted from the transmitter to the receiver and a vertical blank period including a frequency hopping period in which a data transmission speed between the transmitter and the receiver is variable,
the method comprising:
transmitting signals having a first voltage range from the transmitter to the receiver in a first mode;
transmitting signals having a second voltage range less than the first voltage range from the transmitter to the receiver in a second mode;
generating, by a data transmitter included in the transmitter, a first internal clock signal and a second internal clock signal;
generating, by the transmission controller included in the transmitter, a first horizontal synchronization signal in the second mode based on the first internal clock signal in a period except for the frequency hopping period of the vertical blank period, and generating, by the transmission controller included in the transmitter, a second horizontal synchronization signal in the first mode in the frequency hopping period; and
encoding, by an encoder unit included in the transmitter, the first horizontal synchronization signal to horizontal synchronization data in the second mode in the period except for the frequency hopping period of the vertical blank period, and adding a first clock training pattern to the horizontal synchronization data,
the method further comprises determining, by the encoder unit, whether a frequency hopping occurs, and
the method further comprises adding, by the encoder unit, a second clock training pattern different from the first clock training pattern to the horizontal synchronization data after the frequency hopping period is ended, when it is determined that the frequency hopping occurs.

18. The method according to claim 17, wherein a length of the second clock training pattern is longer than a length of the first clock training pattern.

19. The method according to claim 17, wherein the adding the second clock training pattern comprises varying a length of the second clock training pattern based on a change range of the data transmission speed.

20. The method according to claim 19, wherein the varying the length of the second clock training pattern comprises increasing the length of the second clock training pattern as the data transmission speed change range increases.

21. The method according to claim 17, further comprising:
providing, by a frequency hopping controller included in the transmitter, a first register value related to whether the frequency hopping period is in an active state to the encoder unit,
wherein the first register value includes a (1-1)th register value indicating that the frequency hopping period is changed from the active state to an inactive state and a (1-2)th register value indicating that the frequency hopping period is maintained as the active state or the inactive state.

22. The method according to claim 21, further comprising:
providing, by the transmission controller, the encoder unit with an end flag signal indicating that the frequency hopping period is ended, based on the first internal clock signal.

23. The method according to claim 22, wherein the determining whether the frequency hopping occurs comprises determining, by the encoder unit, that the frequency hopping occurs when the encoder unit receives the (1-1)th register value and the end flag signal.

* * * * *